US012058589B2

(12) United States Patent
Akl et al.

(10) Patent No.: US 12,058,589 B2
(45) Date of Patent: Aug. 6, 2024

(54) SELECTIVE FORWARDING OF RRC RECONFIGURATION MESSAGES IN IAB

(71) Applicant: QUALCOMM Incorporated, San Diego, CA (US)

(72) Inventors: Naeem Akl, Somerville, NJ (US); Karl Georg Hampel, Jersey City, NJ (US); Luis Fernando Brisson Lopes, Swindon (GB); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 17/644,551

(22) Filed: Dec. 15, 2021

(65) Prior Publication Data

US 2022/0225060 A1 Jul. 14, 2022

Related U.S. Application Data

(60) Provisional application No. 63/137,707, filed on Jan. 14, 2021.

(51) Int. Cl.
*H04W 4/12* (2009.01)
*H04W 36/00* (2009.01)
*H04W 76/20* (2018.01)
*H04W 76/22* (2018.01)
*H04W 76/30* (2018.01)
*H04W 84/04* (2009.01)
*H04W 88/08* (2009.01)
(Continued)

(52) U.S. Cl.
CPC .............. *H04W 4/12* (2013.01); *H04W 76/20* (2018.02); *H04W 76/30* (2018.02); *H04W 88/14* (2013.01); *H04W 88/184* (2013.01)

(58) Field of Classification Search
CPC ....... H04W 4/12; H04W 76/20; H04W 76/30; H04W 88/14; H04W 88/184
See application file for complete search history.

(56) References Cited

U.S. PATENT DOCUMENTS 11,483,233 B2 * 10/2022 Shariat .................... H04L 45/22
11,751,047 B2 * 9/2023 Teyeb ................. H04W 12/106
726/3
(Continued)

*Primary Examiner* — Jenee Holland
(74) *Attorney, Agent, or Firm* — Procopio, Cory, Hargreaves & Savitch LLP

(57) ABSTRACT

An integrated access and backhaul (IAB) donor central unit (CU) may transmit, to an IAB-node, a plurality of messages for a child of the IAB-node, the plurality of messages including a first message being associated with a first condition, and a second message being associated with a second condition, and transmit an indication instructing the IAB to forward, to the child, the first message if a first condition is met or the second message if a second condition is met. The IAB-node may receive, from the IAB-donor-CU, the indication, determine that one condition among the first condition and the second condition has occurred, forward one of the first message or the second message to the child based on the occurrence of the one condition, and discard the other of the first message or the second message.

31 Claims, 16 Drawing Sheets

(51) Int. Cl.
*H04W 88/14* (2009.01)
*H04W 88/18* (2009.01)

(56) References Cited

U.S. PATENT DOCUMENTS

| | | | |
|---|---|---|---|
| 11,751,218 B2* | 9/2023 | Akl | H04W 72/52 370/329 |
| 2020/0045766 A1* | 2/2020 | Kim | H04W 36/0005 |
| 2021/0274381 A1* | 9/2021 | Teyeb | H04L 1/1854 |
| 2022/0014976 A1* | 1/2022 | Luo | H04W 36/12 |
| 2022/0104110 A1* | 3/2022 | Khanfouci | H04W 36/34 |
| 2022/0151006 A1* | 5/2022 | Muhammad | H04W 76/19 |
| 2022/0303836 A1* | 9/2022 | Wang | H04W 36/08 |
| 2022/0322249 A1* | 10/2022 | Liu | H04W 52/365 |
| 2022/0369190 A1* | 11/2022 | Diao | H04W 36/08 |
| 2023/0072977 A1* | 3/2023 | Fujishiro | H04W 16/26 |
| 2023/0156848 A1* | 5/2023 | Zhu | H04W 36/00725 370/329 |
| 2023/0232294 A1* | 7/2023 | Teyeb | H04W 36/023 370/331 |
| 2023/0247495 A1* | 8/2023 | Teyeb | H04W 36/12 370/331 |
| 2023/0247514 A1* | 8/2023 | Li | H04W 92/20 370/331 |
| 2023/0262557 A1* | 8/2023 | Zhu | H04W 24/04 455/436 |
| 2023/0269626 A1* | 8/2023 | Wang | H04W 28/12 370/329 |
| 2023/0269630 A1* | 8/2023 | Teyeb | H04W 36/0009 370/331 |
| 2023/0269644 A1* | 8/2023 | Teyeb | H04W 36/10 370/331 |
| 2023/0269653 A1* | 8/2023 | Wen | H04W 24/10 370/254 |
| 2023/0276322 A1* | 8/2023 | Liu | H04W 36/0033 370/331 |

\* cited by examiner

SELECTIVE FORWARDING OF RRC RECONFIGURATION MESSAGES IN IAB

CROSS REFERENCE TO RELATED APPLICATION(S)

This application claims the benefit of and priority to U.S. Provisional Application Ser. No. 63/137,707, entitled "SELECTIVE FORWARDING OF RRC RECONFIGURATION MESSAGES IN IAB" and filed on Jan. 14, 2021, which is expressly incorporated by reference herein in its entirety.

TECHNICAL FIELD

The present disclosure relates generally to communication systems, and more particularly, to a method of wireless communication including an integrated access and backhaul (IAB) configured to selectively forward at least one message to reconfigured radio resource control (RRC) connection.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include an IAB-donor central unit (CU) (IAB-donor-CU) and an IAB-node. The IAB-donor-CU may transmit, to an IAB-node, a plurality of messages for a child, the plurality of messages including a first message being associated with a first condition, and a second message being associated with a second condition via a source path established between the IAB-node and a network, the source path including the IAB-donor-CU and a first IAB-donor distributed unit (DU) (IAB-donor-DU), and transmit an indication instructing the IAB to forward, to the child, the first message if a first condition is met or the second message if a second condition is met.

An IAB-node may receive, from a first IAB-donor-CU, a plurality of message including a first message and a second message for a child through a source path established between the IAB-node and a network, the source path including the first IAB-donor-CU and a first IAB-donor-DU, receive an indication to forward the first message to the child if a first condition is met and to forward the second message to the child if a second condition is met, determine that one condition among the first condition and the second condition has occurred, forward one of the first message or the second message to the child based on an occurrence of the one condition, and discard the other of the first message or the second message.

The first condition may be associated with switching a path between the IAB-node and the network from the source path to a first target path different from the source path, and the first message may be transmitted to the IAB-node, based on a successful switching a path between the IAB-node and the network from the source path to the first target path. The first target path may include at least one of a second IAB-donor-CU different from the IAB-donor-CU or a second IAB-donor-DU different from the first IAB-donor-DU.

The plurality of messages may include a third message associated with a third condition relating to a change in a configuration of the child associated with a second target path different from the source path and the first target path, and the IAB-donor-CU may instruct the IAB-node to forward, to the child, the third message and discard the first message and the second message based on the determination that that the third condition has occurred. The IAB-node may determine that the third condition has occurred, forward, to the child, the third message received from the first IAB-donor-CU, based on the determination that the third condition has occurred, and discard the first message and the second message. The IAB-donor-CU may indicate the IAB-node to withhold the first message and the second message until an occurrence of a respective condition. The child may be one of a child IAB-node or a user equipment (UE).

The first message may trigger a change in a configuration of the child associated with a first target path, and the first message may be a radio resource control (RRC) message for at least one of an RRC reconfiguration, an RRC re-establishment, an RRC release, or an RRC setup. The second message may be a message that triggers no change in a configuration of the child.

The plurality of messages may be associated with a same packet data convergence protocol (PDCP) sequence number (SN) (PDCP SN). The plurality of messages may be transmitted in one or more containers of a single message. The IAB-donor-CU individually may transmit the first message and the second message to the IAB-node, and where both the first message and the second message may be associated with the same PDCP SN. The first message or the second message may be sent on F1 application protocol (F1-AP) messages.

The IAB-donor-CU may transmit, to the IAB-node, a reconfiguration message to perform a random access procedure, where the at least one of the first condition or the second condition may be based on successfully performing the random access procedure. The IAB-donor-CU may transmit, to the IAB-node, a reconfiguration message to switch to a target path on a target cell served by a candidate parent node, where the first condition is based on the path between the IAB-node and the network being successfully switched from the source path to a target path based on the transmitted reconfiguration message.

The reconfiguration message may include at least one of an identifier (ID) of the IAB-donor-CU associated with a target cell, or an ID of an IAB-donor-DU via which parent node that provides the target cell that backhauls traffic between the IAB-node and the IAB-donor-CU. The first condition may be determined based on at least one of an ID of an IAB-donor-CU associated with the target cell, or an ID of an IAB-donor-DU via which the parent node holds the first target cell and backhauls traffic between the IAB-node and the IAB-donor-CU.

The IAB-donor-CU may transmit an indication to forward the first message to the child, and the first condition may be based on the indication to forward the first message. The IAB-donor-CU may transmit the indication in a F1-APmessage, an RRC message, a medium access control (MAC) control element (CE) (MAC-CE), or downlink control information (DCI).

The IAB-donor-CU may transmit a reconfiguration message including transport network layer (TNL) information to migrate a signaling connection onto the path holding an IAB-donor-DU, where the first condition is based on at least one of an ID of the IAB-donor-DU or an ID of the IAB-donor-CU associated with the IAB-donor-DU. The IAB-donor-CU may transmit a backhaul adaptation protocol (BAP) configuration message associated with an IAB-donor-DU, where the first condition is based on at least one of an ID of the IAB-donor-DU or an ID of the IAB-donor-CU associated with the IAB-donor-DU. The second condition may be based on whether the first condition occurs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
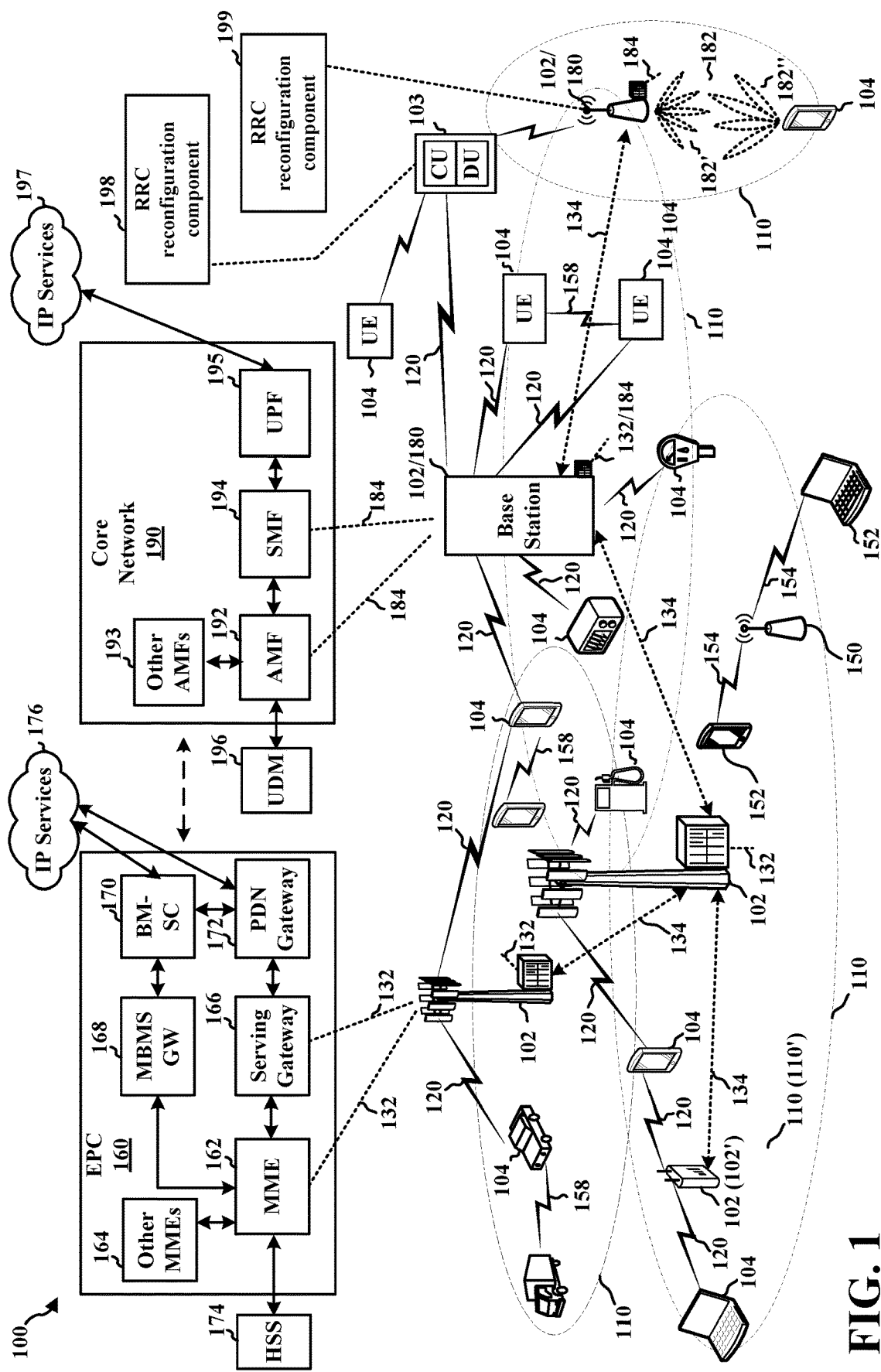
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP- GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communication system and access network 100 may include an integrated access and backhaul (IAB) network that includes multiple cells in communication with each other to provide an access network and a backhaul network to a core network such as core network 190 or Evolved Packet Core (EPC) 160. The core network 190 may be a 5G Core (5GC) a core network that supports new radio (NR) communication or another type of core network. The IAB network may include one or more IAB-donors 103. The IAB-donor may exchange communication with a base station/IAB-node 102 or 180, and/or with UEs 104.

Referring again to FIG. 1, in certain aspects, the IAB-donor 103 may include a RRC reconfiguration component 198 configured to transmit, to an IAB-node, a plurality of messages for a child, the plurality of messages including a first message being associated with a first condition, and a second message being associated with a second condition via a source path established between the IAB-node and a network, the source path including the IAB-donor-CU and a first IAB-donor-DU, and transmit an indication instructing the IAB to forward, to the child, the first message if a first condition is met or the second message if a second condition is met. In certain aspects, the base station/IAB-node 102 may include a RRC reconfiguration component 199 configured to receiving, from a first IAB-donor-CU, a plurality of message including a first message and a second message for a child through a source path established between the IAB-node and a network, the source path including the first IAB-donor-CU and a first IAB-donor-DU, receive an indication to forward the first message to the child if a first condition is met and to forward the second message to the child if a second condition is met, determine that one condition among the first condition and the second condition has occurred, forward one of the first message or the second message to the child based on an occurrence of the one condition, and discard the other of the first message or the second message. Although examples in the following description may be focused on 5G NR, the concepts described herein may be applicable to other similar areas, such as LTE, LTE-A, CDMA, GSM, and other wireless technologies.

The wireless communications system (also referred to as a wireless wide area network (WWAN)). The base stations 102 illustrated in FIG. 1 may support macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the IAB-donor 103 may include a RRC reconfiguration component 198 configured to transmit, to an IAB-node, a plurality of messages for a child, the plurality of messages including a first message being associated with a first condition, and a second message being associated with a second condition via a source path established between the IAB-node and a network, the source path including the IAB-donor-CU and a first IAB-donor-DU, and transmit an indication instructing the IAB to forward, to the child, the first message if a first condition is met or the second message if a second condition is met. In certain aspects, the base station/IAB-node 102 may include a RRC reconfiguration component 199 configured to receiving, from a first IAB-donor-CU, a plurality of message including a first message and a second message for a child through a source path established between the IAB-node and a network, the source path including the first IAB-donor-CU and a first IAB-donor-DU, receive an indication to forward the first message to the child if a first condition is met and to forward the second message to the child if a second condition is met, determine that one condition among the first condition and the second condition has occurred, forward one of the first message or the second message to the child based on an occurrence of the one condition, and discard the other of the first message or the second message. Although examples in the following description may be focused on 5G NR, the concepts described herein may be applicable to other similar areas, such as LTE, LTE-A, CDMA, GSM, and other wireless technologies.

Figures 2A, 2B, 2C, 2D:
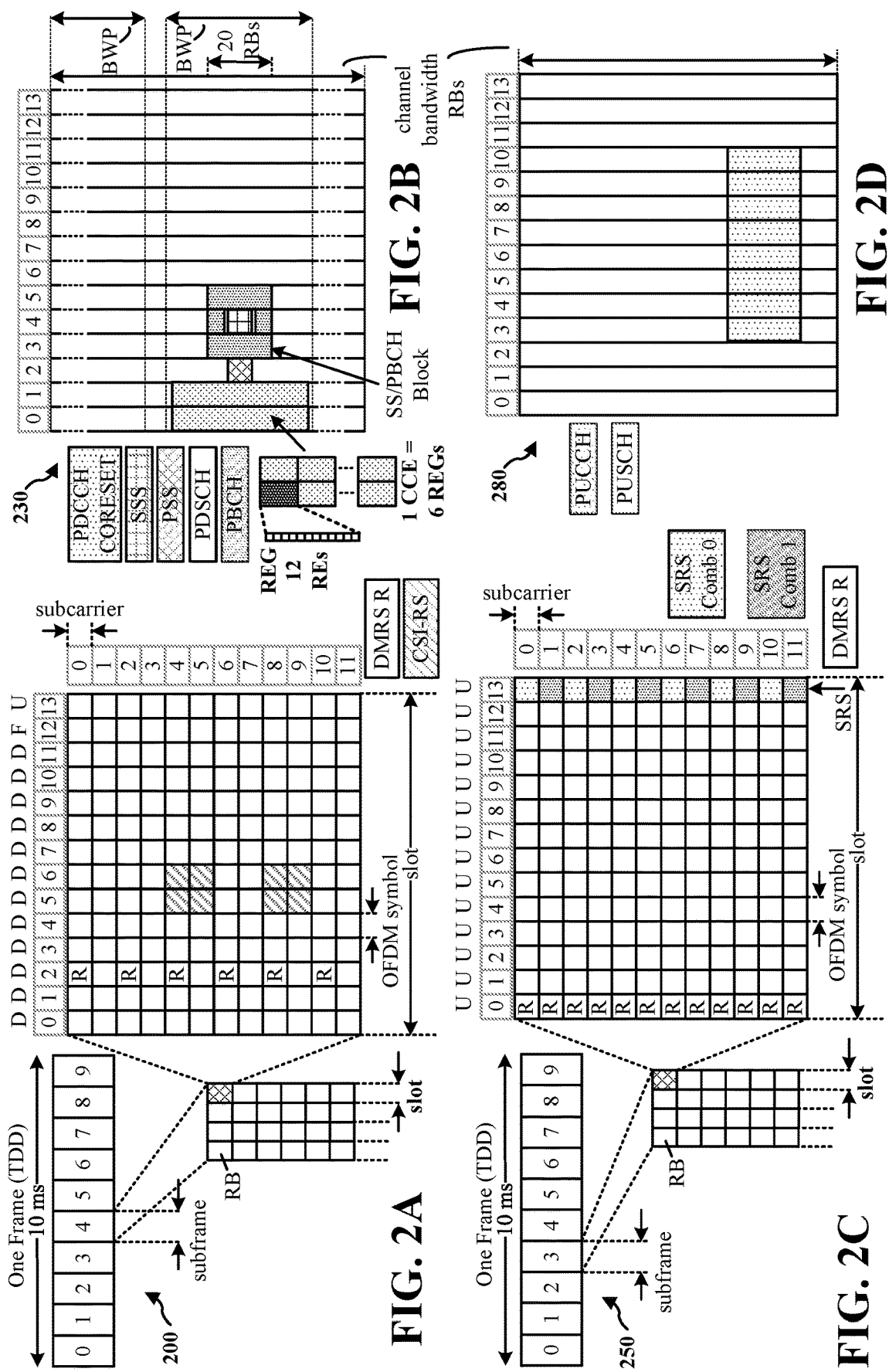
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
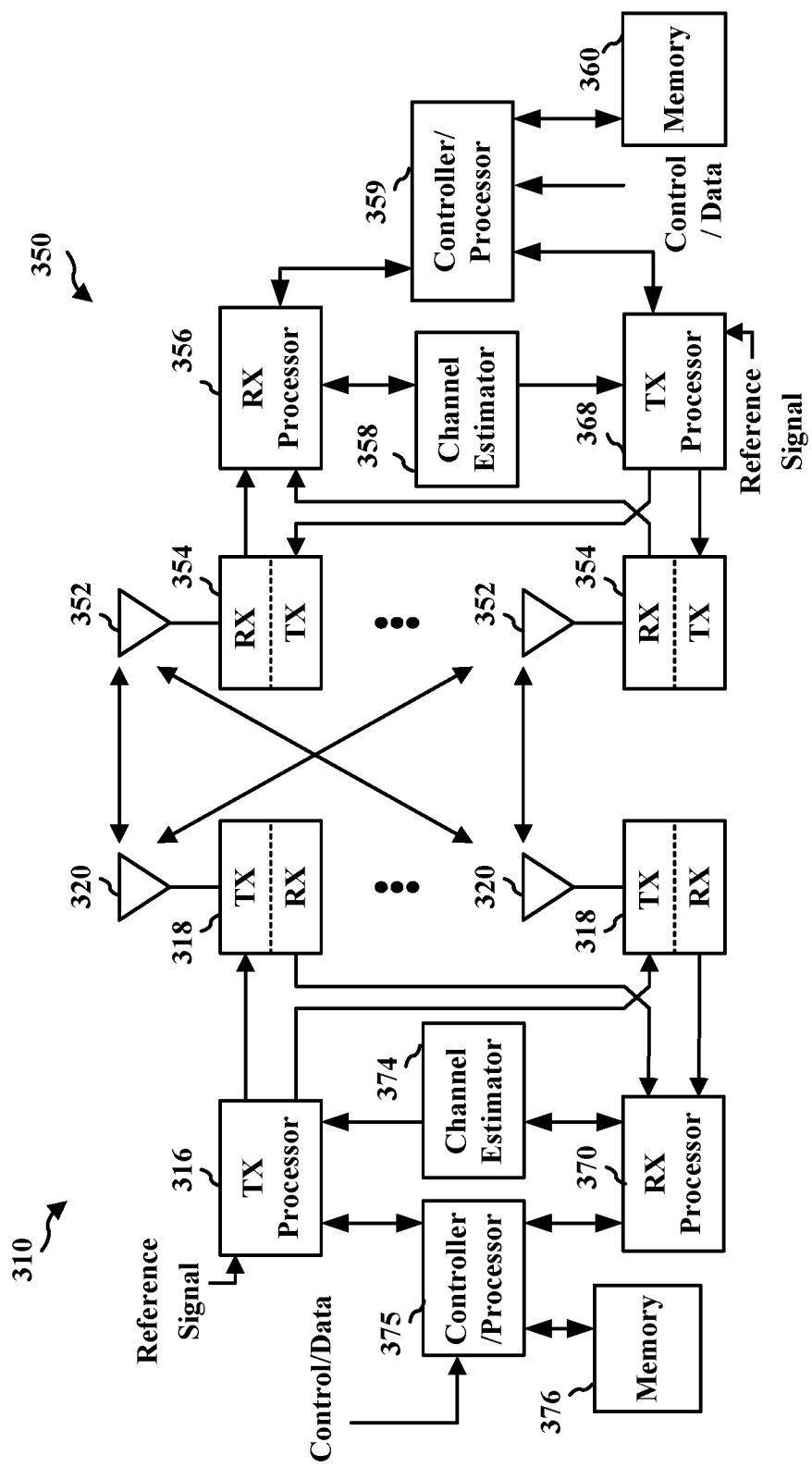
FIG. 3 is a diagram illustrating an example of a base station and user equipment (UE) in an access network.

FIG. 3 is a block diagram of a first wireless device 310 in communication with a second wireless device 350 in an access network. In some examples, the first wireless device may be base station and the second wireless device may be a UE. In other examples, the first wireless device 310 may be a first base station and the second wireless device 350 may be a second base station. In some examples, the first wireless device 310 may be a base station and the second wireless device may be an IAB-node. In some examples, the first wireless device 310 may be an IAB-node and the second wireless device 350 may be a UE. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate a radio frequency (RF) carrier with a respective spatial stream for transmission.

At the device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the device 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the device 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 198 and 199 of FIG. 1.

Figure 4:
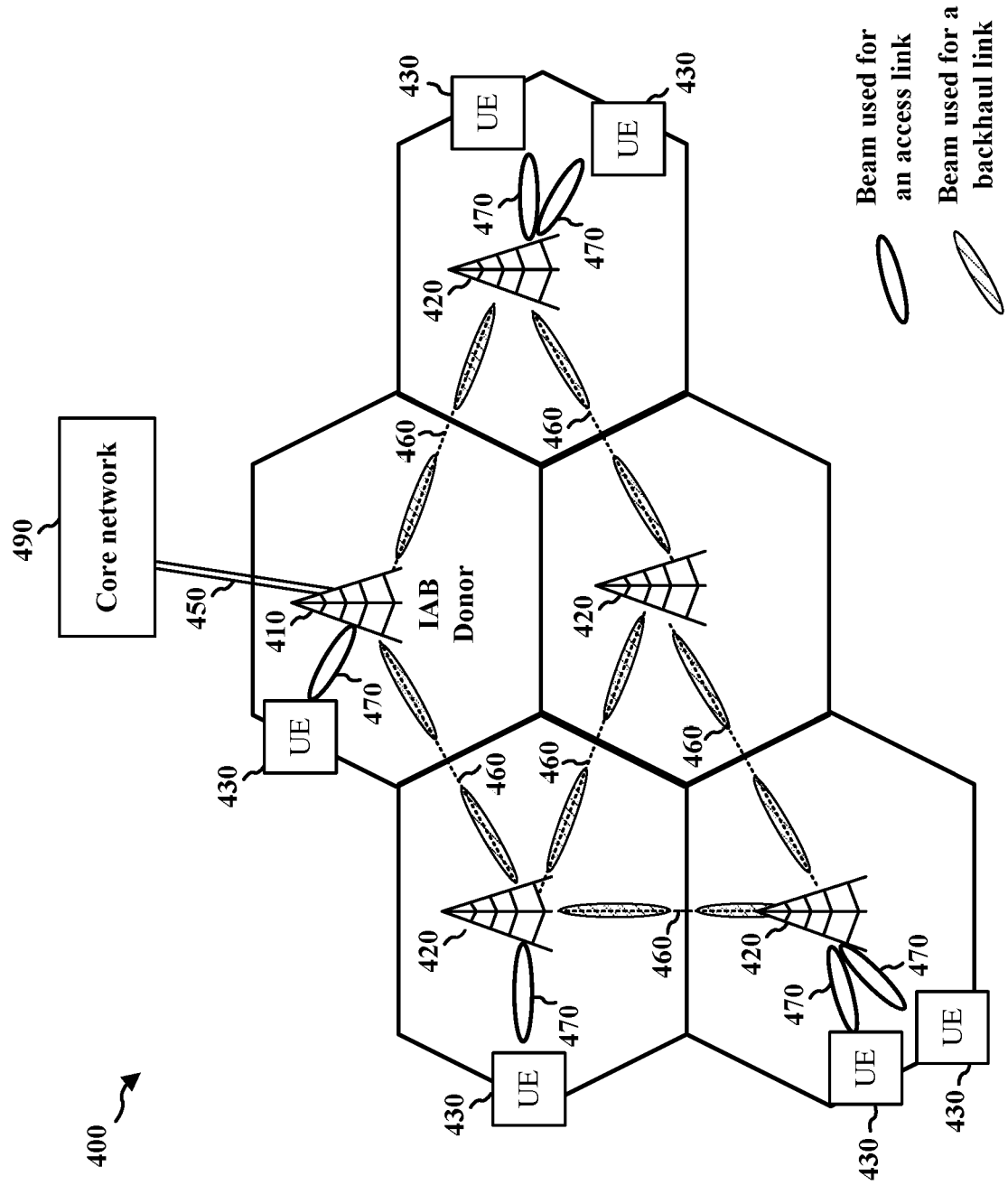
FIG. 4 is a diagram illustrating an example IAB network.

FIG. 4 is a diagram illustrating an IAB network 400. The IAB network provides access network functionality between access nodes (ANs) and other ANs/UEs, and backhaul network functionality between ANs. The ANs include IAB-donors, which have a wireline connection to the core network, and IAB-nodes, which operate wirelessly and relay traffic to/from IAB-donors through one or more AN hops. The IAB ANs share resources between the access and backhaul. That is, the resources used for access communication between the ANs and ANs/UEs are also used for backhaul communication between the ANs.

The IAB network 400 may include an anchor node (that may be referred to herein as an "IAB-donor") 410 and access nodes (that may be referred to herein as "IAB-nodes") 420. The IAB-donor 410 may be a base station, such as a gNB or eNB, and may perform functions to control the IAB network 400. The IAB-nodes 420 may include L2 relay nodes, etc. Together, the IAB-donor 410 and the IAB-nodes 420 share resources to provide an access network and a backhaul network to the core network 490. For example, resources may be shared between access links and backhaul links in the IAB network.

UEs 430 interface with the IAB-nodes 420 or the IAB-donor 410 through access links 470. The IAB-nodes 420 communicate with each other and with the IAB-donor 410 through backhaul links 460. The IAB-donor 410 is connected to the core network 490 via a wireline backhaul link 450. The UEs 430 communicate with the core network 490 by relaying messages through their respective access link 470 to the IAB network 400, which then may relay the message through backhaul links 460 to the IAB-donor 410 to communicate with the core network 490 through the wireline backhaul link 450. Similarly, the core network 490 may communicate with a UE 430 by sending a message to the IAB-donor 410 through the wireline backhaul link 450. The IAB-donor 410 sends the message through the IAB network 400 via backhaul links 460 to the IAB-node 420 connected to the UE 430, and the IAB-node 420 sends the message to the UE 430 via the access link 470.

Each IAB node, e.g., including IAB donor 410 and each IAB node 420, may use a PCI value. The PCI value may serve as an identifier for the IAB donor 410 or the IAB node 420. The PCI value may be used to determine a scrambling sequence that may be applied to physical signals and/or channels that are transmitted by a particular IAB node. For example, a PSS and/or the SSS transmitted by the respective IAB donor 410 or IAB node 420 may be scrambled using a scrambling sequence that may be based on the PCI used by the respective IAB node.

Figure 5:
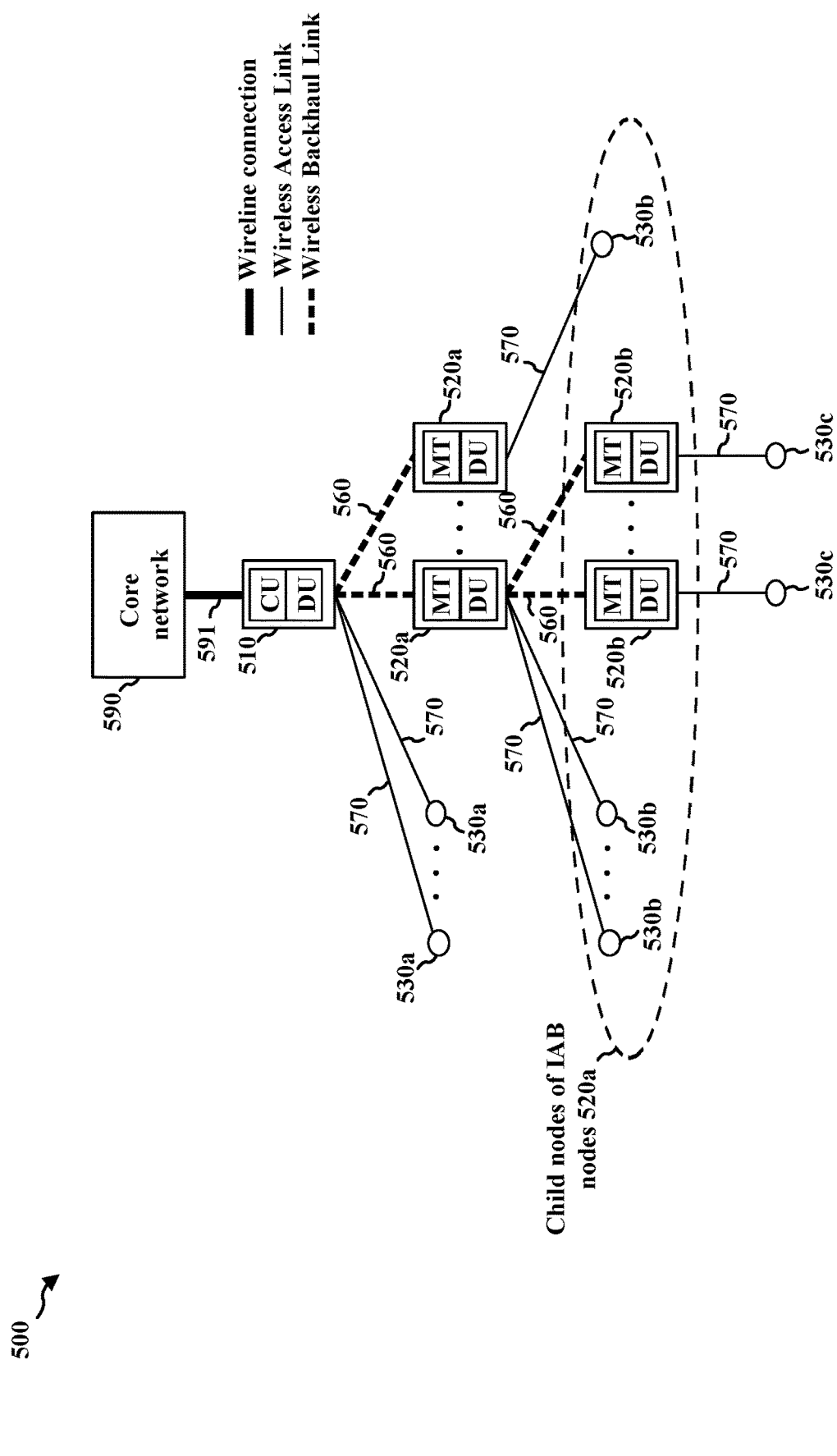
FIG. 5 is a diagram illustrating an example IAB network and components thereof.

FIG. 5 is a diagram illustrating an IAB network 500 and components thereof. The IAB network 500 includes an IAB donor node 510 and IAB nodes 520a-520b. The IAB nodes 520a-520b, as well as the IAB donor node 510, may provide wireless access links to UEs 530a-530c.

The IAB donor node 510 may be considered a root node of the tree structure of the IAB network 500. The IAB donor node 510 may be connected to the core network 590 via a wired connection 591. The wired connection may comprise, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of the IAB donor node 510. The IAB donor node 510 may be connected to its child IAB nodes 520a via backhaul links 560, and may be connected to the child UEs 530a via access links 570. The IAB nodes 520a that are children nodes of IAB node 510 may also have IAB node(s) 520b and/or UE(s) 530b as children. For example, IAB nodes 520b may further connect to child nodes and/or child UEs. FIG. 5 illustrates IAB nodes 520b providing an access link to UEs 530c, respectively.

The IAB donor node 510 may include a central unit (CU) and a distributed unit (DU). The CU may provide control for the IAB nodes 520a, 520b in the IAB network 500. For example, the CU may control the IAB network 500 through configuration. The CU may perform RRC/PDCP layer functions. The IAB donor nodes 510 further include a DU that may perform scheduling. For example, the DU may schedule resources for communication by the child IAB nodes 520a and/or UEs 530a of the IAB donor node 510. The DU is associated with radio link control (RLC), media access control (MAC), and physical (PHY) layer functions.

The IAB nodes 520a, 520b may include a mobile termination (MT) and a DU. The IAB node may be an L2 relay node. The MT of IAB node 520a may operate as a scheduled node that may be scheduled similar to a UE 530a by the DU of the parent node, e.g., IAB donor node 510. The MT of IAB node 520b may operate as a scheduled node of parent node 520a. The DU may schedule the child IAB nodes 520b and UEs 530b of the IAB node 520a. An IAB node may provide a connection to an IAB node that in turn provides another connection for another IAB node. The pattern of a parent IAB node comprising a DU that schedules a child IAB node/child UE may continue to more connections.

Figure 6:
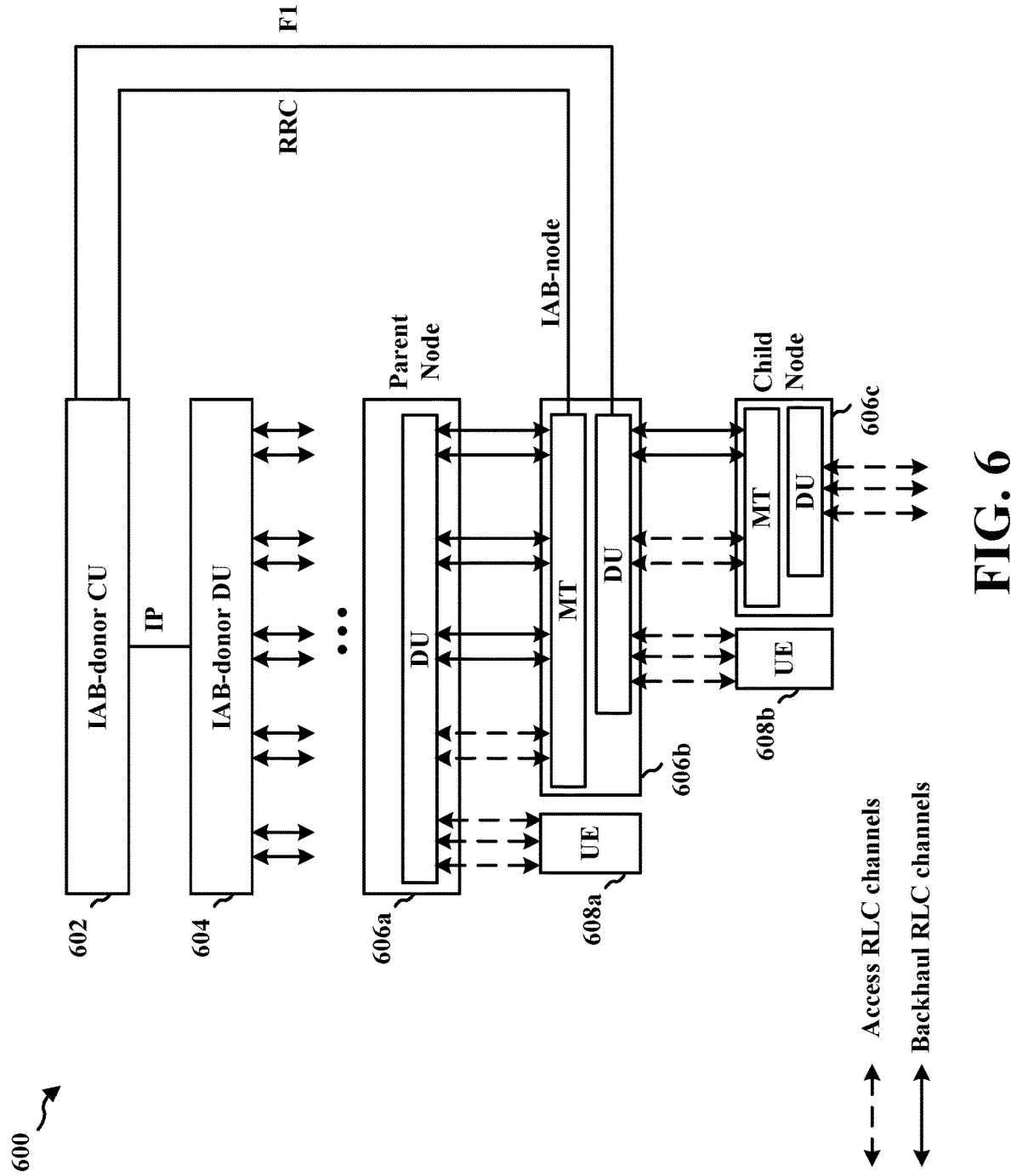
FIG. 6 is a diagram illustrating RLC channels in an IAB network.

FIG. 6 is a diagram 600 illustrating RLC channels in an IAB network. As discussed supra, the IAB network provides both access network functionality and backhaul network functionality. The IAB network includes an IAB-donor with a CU 602 and a DU 604. In order to provide access network functionality, IAB-nodes 606a, 606b, and 606c may communicate with other UEs 608a and 608b and/or MTs of other IAB ANs through access RLC channels. Thus, the IAB-nodes 606a, 606b, and 606c operate as access IAB-nodes for their child nodes or UEs. In order to provide backhaul network functionality, IAB-nodes 606a, 606b, and 606c may route traffic to other IAB-nodes (e.g., 606a, 606b, and 606c) through backhaul RLC channels (BH RLC CHs). Thus, the IAB-nodes 606a, 606b, and 606c may operate as an intermediate IAB-node when backhauling traffic for other IAB-nodes. Access RLC channels include UE-to-DU/DU-to-UE, carrying PDCP for RRC or data radio bearers (DRBs), and MT-to-DU/DU-to-MT, carrying PDCP for RRC (or DRBs). Backhaul RLC channels include MT-to-DU/DU-to-MT, carrying backhaul adaptation protocol (BAP) messages for backhauling access traffic.

RRC connections may be established between the CU of the IAB-donor and IAB-nodes and/or UEs. The RRC connections may be established between the CU of the IAB-donor and the MTs of the IAB-nodes and between the CU of the IAB-donor and the UEs. The RRC connections may include two parts of RRC security mechanisms; an RRC integrity protection and an RRC confidentiality protection. When a sender transmits a message to a receiver, the RRC integrity protection may prevent another entity from altering the message between the sender and the receiver. The RRC integrity protection may be provided by augmenting, e.g., adjusting or changing, the RRC messages transmitted between the UE and the base station by adding a certain value that is computed over the transmitted message. The receiver of the message may verify whether the content of the message has changed based on the added value. If there is a mismatch in the added value, the receiver may consider that the message is corrupt and drop the received message. The RRC integrity protection may be provided by the PDCP layer between a UE and a base station, for example, and layers below the PDCP may not be integrity protected. The RRC integrity checks may be performed both at the UE and the base station. If an integrity check is failed or unsuccessful (e.g., based on a faulty or missing MAC-I) is detected after the start of integrity protection, the corresponding message may be discarded. Additionally or alternatively, the UE may trigger a recovery procedure.

In some aspects, when a first UE transmits a message to a base station, a second UE may receive the message, but the second UE may not be able to understand what is included in the message, e.g., may not be able to decode the message. The 32-bit PDCP COUNT may be input to an integrity algorithm, such as a 128-bit NEA algorithm for NR encryption algorithms, to perform reordering as an integrity check. A security key may be used to provide RRC integrity protection and RRC confidentiality protection.

In some aspects, replay protection may be activated when the integrity protection is activated, e.g., except for when the selected integrity protection algorithm is NIA0. The message transmitted between the sender and the receiver may carry a SN of a 32-bit PDCP COUNT value of the PDCP SN, and the replay protection may help to ensure that the receiver accepts each particular incoming PDCP SN value once using the same AS security context. That is, the 32-bit PDCP SN may be input to the 128-bit NIA algorithms (NR integrity algorithms), and the RRC integrity protection and the RRC confidentiality protection may be provided by using the security key and the PDCP SN. Since the PDCP SN may be incremented for every message transmitted between the sender and the receiver, even if the sender transmits the same message, the encrypted message transmitted may not be identical due to the incremented PDCP SN.

In some aspects, a PDCP reordering timer may be configured for reordering the received packets. The duration of the timer may be configured by upper layers. In some aspects, such as for NR sidelink the duration of the timer may be based on another implementation. The timer may be used to detect loss of PDCP Data PDUs. The PDCP reordering timer may be inactive when the PDCP SNs of the received messages are in sequence. When a received message has a PDCP SN that is not sequential from the preceding message, the PDCP reordering timer may be triggered. When the PDCP reordering timer is triggered, the PDCP waits for the messages with the missing PDCP SN. While the PDCP reordering timer is running, another, additional PDCP reordering timer may not be started. That is, one PDCP reordering timer per receiving PDCP entity may be running at a given time. When the PDCP reordering timer expires, the receiving PDCP entity may deliver the messages to upper layers in ascending order of the associated PDCP SN value after performing header decompression, if not decompressed before. That is, the receiving PDCP entity may deliver all the stored PDCP SDU(s) with associated PDCP SN values smaller than the PDCP SDU with out-of-sequence PDCP SN; RX_REORD, and all stored PDCP SDUs with consecutively associated PDCP SN values starting from the RX_REORD.

In some aspects, the default PDCP reordering timer for signaling radio bearers (SRBs), including control traffic such as the RRC message, may be infinity. That is, the communication of the RRC message may be transmitted in an acknowledge mode, the receiver may reliably expect that the missing messages may be properly transmission, eventually. Since the PDCP reordering timer for transmitting RRC message may be set to infinity, the receiving PDCP entity may not skip the missing PDCP SN (SN).

Figure 7:
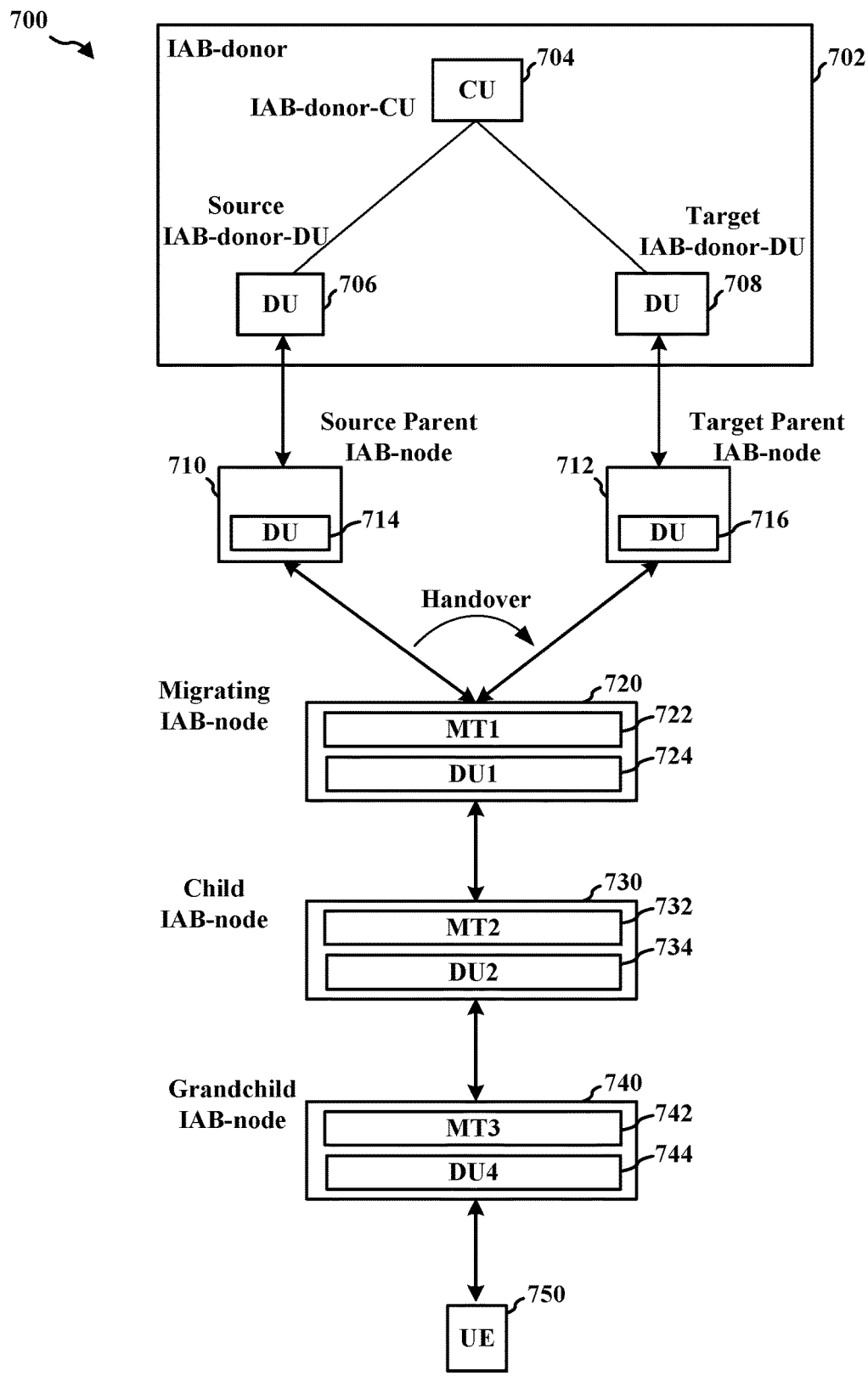
FIG. 7 is a diagram illustrating an example diagram for an IAB network.

FIG. 7 is a diagram illustrating an example diagram 700 for an IAB network that may support a handover of an IAB-node 720 between a source and target donor node. The IAB network may include, at least, an IAB-donor 702 including an IAB-donor-CU 704, a source IAB-donor-DU 706, and a target IAB-donor-DU 708, a source parent IAB-node 710 including a source parent IAB-node-DU 714, a target parent IAB-node 712 including a target parent IAB-node-DU 716, a migrating IAB-node 720, a child IAB-node 730, a grandchild IAB-node 740, and a UE 750. The IAB network may also include additional IAB-nodes. FIG. 7 illustrates a switching of the path, or a handover, between the migrating IAB-node 720 and the IAB-donor-CU 704 from a source path via the source parent IAB-node 710 to a target path via the target parent IAB-node 712. After the path has been switched from the source path to the target path, the migrating IAB-node 720, child IAB-node 730, and grandchild IAB-node 740 may be reconfigured based on the target path. That is, the migrating IAB-node-MT 722 of the migrating IAB-node 720, the child IAB-node-MT 732 of the child IAB-node 730, and the grandchild IAB-node-MT 742 of the grandchild IAB-node 740 may perform the RRC reconfiguration, and the migrating IAB-node-DU 724 of the migrating IAB-node 720, the child IAB-node-DU 734 of the child IAB-node 730, and the grandchild IAB-node-DU 744 of the grandchild IAB-node 740 may perform a transport network layer (TNL) migration including the security migration based on the switching of the path from the source path to the target path.

Figure 8:
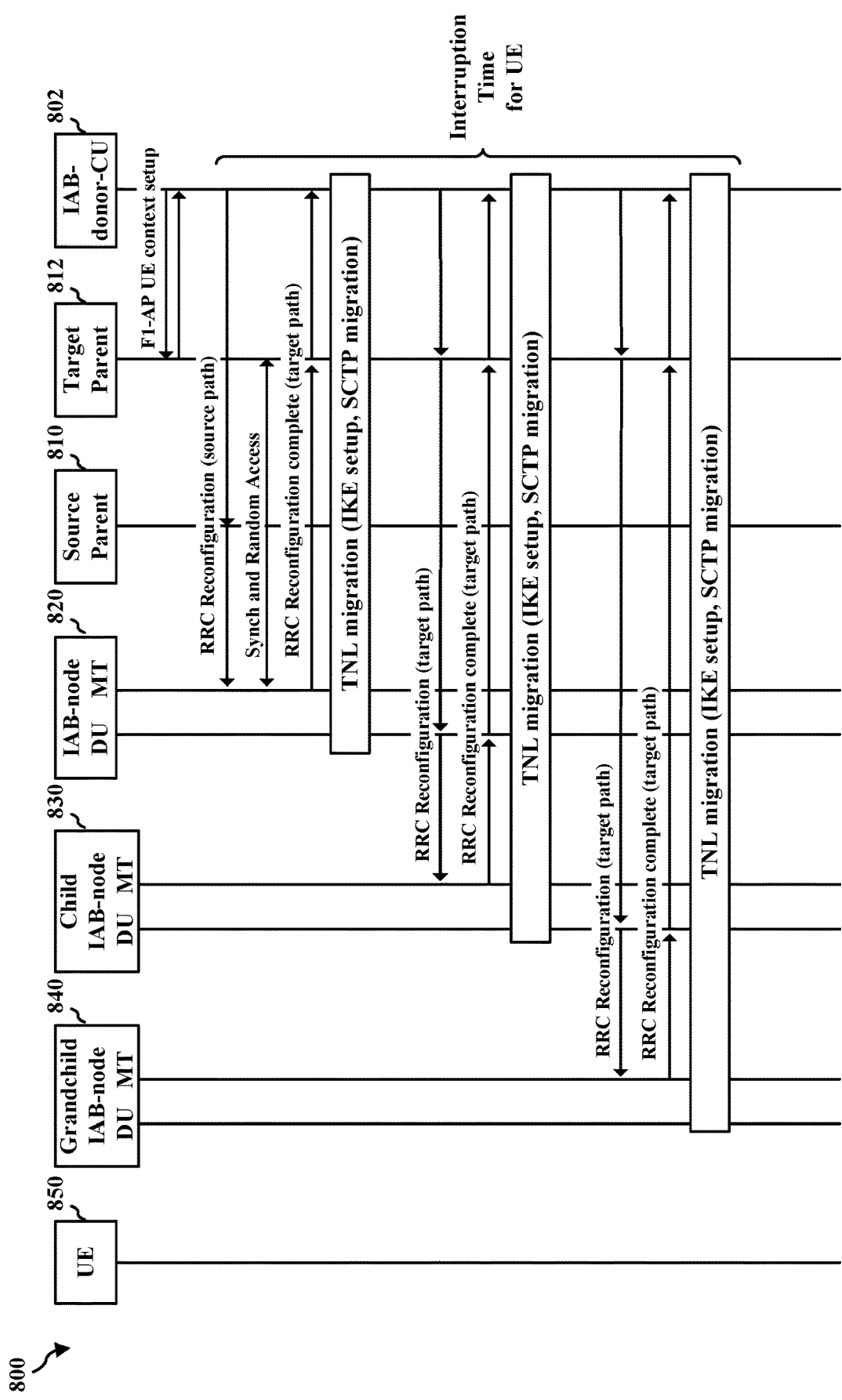
FIG. 8 is a communication flow diagram of a method of wireless communication.

FIG. 8 is a communication flow diagram 800 of a method of wireless communication. The communication flow diagram 800 may include an IAB-donor-CU 802, a source parent IAB-nodes 810, a target parent IAB-node 812, an IAB-node 820, a child IAB-node 830, grandchild IAB-node 840, and a UE 850. The communication flow diagram 800 may illustrate a series of processes of the switching of the path between the IAB-node 820 and the IAB-donor-CU 802 from the source path including the source parent IAB-nodes 810 to the target path including the target parent IAB-node 812, and the subsequent migration of the child IAB-node 830 and the grandchild IAB-node 840. The communication flow diagram 800 may illustrate that the descendent IAB-nodes may be sequentially reconfigured after the handover of the IAB-node 820 has occurred.

First, the IAB-node 820 may be handed over from the source parent IAB-node 810 to the target parent IAB-node 820. The IAB-node MT may be first handed over to the target parent IAB-node 812, which interrupts the source path. Subsequently, the IAB-node DU's TNL and F1-C association may be migrated to the target path. The TNL migration may include internet key exchange (IKE) setup and/or stream control transmission protocol (SCTP) migration. The IAB-node DU's TNL and F1-C migration may be the pre-requisite for the delivery of the RRC reconfiguration message to the child IAB-node MT, which provides new UL mappings and IP addresses anchored on the target IAB-donor-DU. Based on this RRC reconfiguration message, the child IAB-node DU can migrate its own TNL and F1-C association to the target path.

In some aspects, the child IAB-node DU's TNL and F1-C migration may be performed before the delivery of the RRC reconfiguration message to the grandchild IAB-node MT, which may provide new UL mappings and IP addresses to the grandchild IAB-node. Based on this RRC reconfiguration, the grandchild child IAB-node DU may migrate its TNL and F1-C association to the target path.

This procedure may be sequential in nature as the F1-C on one tier is migrated prior to carrying the RRC reconfiguration for the next tier. The migration of each TNL and F1-C association further involves multiple handshakes as it includes the migration of IP security (IPsec), SCTP, and F1 application protocol (F1-AP).

Accordingly, the migration of the entire subtree of descendant nodes may be slow and may lead to large interruption times. That is, the reconfiguration of descendent nodes after the IAB-node MT handover may involve a sequential tier-by-tier migration procedure, which may lead to large interruption times.

Figure 9:
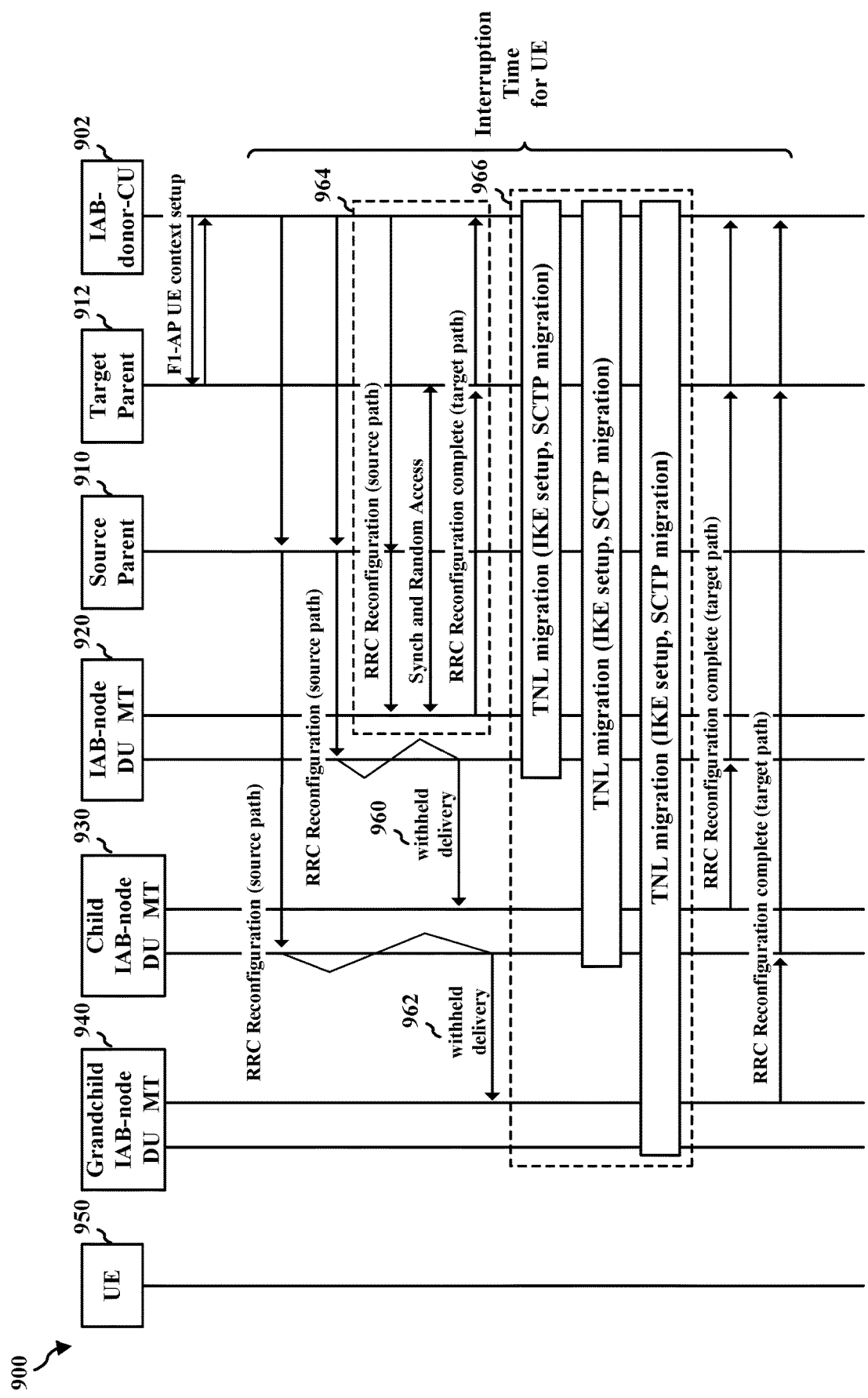
FIG. 9 is a communication flow diagram of a method of wireless communication.

FIG. 9 is a communication flow diagram 900 of a method of wireless communication for reconfiguration via a source path conditionally on a successful handover execution. The conditional reconfiguration may help to reduce interruption time for communication over the IAB network. The communication flow diagram 900 illustrates communication between an IAB-donor-CU 902, a source parent IAB-nodes 910, a target parent IAB-node 912, an IAB-node 920, a child IAB-node 930, grandchild IAB-node 940, and a UE 950. The aspects presented in connection with FIG. 9 may also be applied to IAB networks having a different number of IAB-nodes (e.g., intermediate IAB-nodes) than those illustrated in FIG. 9. The communication flow diagram 900 illustrates an example of a series of processes of the switching of the path between the IAB-node 920 and the 902 from the source path including the source parent IAB-nodes 910 to the target path including the target parent IAB-nodes 912, and the subsequent migration of the child IAB-node 930 and the grandchild IAB-node 940 based on the occurrence of one or more conditions.

In some aspects, the reconfiguration of the same topology may be performed by transmitting the RRC reconfiguration messages to the descendant nodes by the IAB-donor-CU 802 via the source path before the handover of the IAB-node 820. However, the RRC reconfiguration messages may be held back by the respective parent nodes until they receive an indication that the handover has been successfully executed and the target path has become available. Thus, a condition for sending the RRC reconfiguration message may be receipt of an indication that a handover is successful. That is, if the RRC reconfiguration message is transmitted to the respective child nodes before the handover has been successfully executed, the respective child nodes may initiate the TNL migration based on the received RRC reconfiguration message before the target path has become available, and the TNL migration may fail. Accordingly, the RRC reconfiguration message may be delivered to the DU of the respective parent IAB-nodes before the handover via the source path, and withhold the delivery of the RRC reconfiguration message until the handover is complete.

The respective parent IAB-node may release the withheld RRC reconfiguration message for its respective child IAB-node MT after completing a successful random access procedure 964 to handover the connection. The IAB-node may initiate the TNL migration based on the RRC reconfiguration message received from their respective parent IAB-nodes. Also, the respective child IAB-nodes may interpret the reception of the RRC reconfiguration message from their respective parent IAB-nodes as an indication to release the RRC reconfiguration messages they hold for their respective child nodes.

That is, the IAB-node 920 may release the withheld RRC reconfiguration message 960 to the child IAB-node MT after performing the successful random access procedure. The child IAB-node 930 may initiate the TNL migration based on the RRC reconfiguration message 960 received from the IAB-nodes 920. Also, the child IAB-node 930 may interpret the reception of the RRC reconfiguration message 960 from the parent IAB-node 920 as an indication to release the RRC reconfiguration message 962 that the child IAB-node 930 is holding for the grandchild IAB-node 940. The child IAB-node 930 may release the withheld RRC reconfiguration message 962 to the grandchild IAB-node MT. The grandchild IAB-node 940 may initiate the TNL migration based on the RRC reconfiguration message 962 received from the child IAB-nodes 930.

Accordingly, the procedure may create a hop-by-hop indication for the migration of TNL and F1-C, which may improve migration timing. Further, the TNL/F1-C migrations 966 may be conducted concurrently by the IAB-node 920 and its descendant node including the child IAB-node 930 and the grandchild IAB-node 940, which may reduce the interruption time for the UE 950 over the communication flow diagram 800 shown in FIG. 8.

Accordingly, delivering the RRC reconfiguration message to the respective parent IAB-node via the source path and delivering to the respective child IAB-node conditionally on the successful handover execution may enable concurrent TNL and F1-C migration across all tiers, which substantially reduces interruption times.

In some aspects, the handover procedure 964 at the IAB-node 920 may fail, and the IAB-node 920 may lose the connection with the IAB-node-CU 902. The IAB-node 920 may re-establish a connection with the network, and the newly established path may not be associated with the RRC reconfiguration message transmitted to the IAB-node 920 and child IAB-node 930. Accordingly, the RRC reconfiguration messages that the respective parent IAB-nodes are withholding may not have the proper information for the new path established by the IAB-node 920 and the network.

In some aspects, when the migration of parent IAB-node fails, there may be two possible actions that the respective parent IAB-nodes may take. In one aspect, the reconfiguration message of the child IAB-node may be executed but may carry the wrong configuration. That is, the respective parent IAB-nodes may determine to deliver the RRC reconfiguration messages to the respective child IAB-nodes in response to the failure of the hand over procedure 964. Since the withheld RRC reconfiguration messages have the correct PDCP SN that the respective child IAB-nodes may be expecting, the respective child IAB-nodes may not trigger the PDCP reordering sequence. However, the withheld RRC reconfiguration messages may not have the proper information for the respective child IAB-nodes to establish the RRC connection through the newly established path between the 920 and the network, and the RRC configuration and the TNL migration may fail.

In another aspect, the reconfiguration messages for the respective child IAB-nodes may be discarded, but this consumes a PDCP SN on the child IAB-node's SRB1, which increases the PDCP reordering delay for the subsequent messages. That is, the respective parent IAB-nodes may determine to discard the withheld RRC reconfiguration messages in response to the failure of the handover procedure 964. After the withheld RRC reconfiguration messages are discarded and not transmitted to the respective child IAB-nodes, the respective parent IAB-node may relay the new RRC reconfiguration messages, received from the IAB-donor-CU, corresponding to the newly established path. However, due to the incremented PDCP SN, the new RRC reconfiguration messages may not have the same PDCP SN as the withheld RRC reconfiguration messages. On the other hand, the respective child IAB-nodes may be expecting to receive the RRC reconfiguration messages with the PDCP SN that is the same as the discarded withheld RRC reconfiguration messages. As the new RRC reconfiguration messages have incremented the PDCP SN, the respective child IAB-node may start the PDCP reordering timer and wait for the discarded RRC message to arrive, which may result in a PDCP delay. If the PDCP reordering timer is infinity, the PDCP SN may not be skipped.

In some aspects, to address the discrepancy in the information of the withheld RRC reconfiguration message and the PDCP sequence numbering, the IAB-donor-CU may send multiple RRC containers with the same PDCP SN to the respective parent IAB-nodes. The respective parent IAB-nodes may selectively forward the RRC messages depending on the outcome of the parent node migration. That is, the IAB-donor-CU may transmit multiple RRC messages with the same PDCP SN to the respective parent IAB-nodes and instruct the respective parent IAB-nodes to selected forward the RRC message that corresponds with the outcome of the parent node migration. The multiple RRC messages may be transmitted in multiple containers of a single message, or the multiple RRC messages may individually be transmitted to the respective parent IAB-nodes. In both cases, the multiple RRC messages may have the same PDCP SN.

In some aspects, an IAB-donor-CU may send, to an IAB-node, a first message and a second message for a child of the IAB-node of the IAB-node, and indicate to the IAB-node to forward the first message to the child of the IAB-node node and discard the second message if a first condition is satisfied, or to forward the second message to the child of the IAB-node node and discard the first message if a second condition is satisfied. Here, the IAB-donor-CU may be a first base station, an IAB-donor, an IAB-donor-CU, etc., and the IAB-node may be a second BS, an IAB-DU, etc. That is, the IAB-donor-CU may transmit the first message associated with the first condition and the second message associated with the second condition to the IAB-node and instruct the IAB-node to forward one of the first message or the second message based on an occurrence of the one condition and discard the other of the first message or the second message.

In some aspects, an IAB-node may receive, from the IAB-donor-CU, a first message and a second message for a child of the IAB-node of the IAB-node, and forward the first message to the child of the IAB-node and discard the second message if a first condition is satisfied, or forward the second message to the child of the IAB-node and discard the first message if a second condition is satisfied. That is, the IAB-node may receive from the IAB-donor-CU a plurality of message including a first message and a second message for a child of the IAB-node, receive an indication to forward the first message to the child of the IAB-node if a first condition is met and to forward the second message to the child of the IAB-node if a second condition is met, and forward one of the first message or the second message to the child of the IAB-node based on an occurrence of the one condition and discard the other.

In some aspects, the IAB-donor-CU may send a third message for a child of the IAB-node of the IAB-node to the IAB-node, where the IAB-node forward the third message to the child of the IAB-node and discards the first and second messages if a third condition is satisfied, or discard the third message if any of the first or second condition is satisfied. That is, the plurality of messages transmitted by the IAB-donor-CU may include a third message associated with a third condition relating to a change in a configuration of the child of the IAB-node associated with a second target path different from the source path and the first target path. The IAB-donor may receive the plurality of messages including the third message, determine that the third condition has occurred, and forward, to the child of the IAB-node, the third message received from the first IAB-donor-CU based on the determination that the third condition has occurred and discard the first message and the second message.

In some aspects, the IAB-donor-CU may indicate to the IAB-node to withhold the delivery of the first message and the second message until one of the first or second condition is satisfied. That is, the IAB-node may not know the content of the first message and the second message, and therefore, the IAB-donor-CU may transmit a separate indication to the IAB-node to withhold the delivery of the first message and the second message until one of the first or second condition is satisfied. In some aspects, the child of the IAB-node may be a UE or a child IAB-node.

In some aspects, the first message or the second message may carry a PDCP SN. That is, the plurality of messages may carry the PDCP SN. In one aspect, the first message and the second message may carry the same SN, and in another aspect, the first message or the second message may be an RRC message, e.g., RRC reconfiguration with or without sync, RRC re-establishment, RRC release, RRC setup, etc. That is, the RRC reconfiguration with or without sync may be for inter/intra donor migration or handover, the RRC re-establishment may be for the failed handover, the RRC release may be for triggering a new RRC establishment, and the RRC setup may be for establishing a new RRC connection.

In one aspect, the first or second messages may be a dummy message, e.g., a message that does not trigger a change of a particular configuration at the child of the IAB-node. That is, the plurality of messages may include dummy messages that do not trigger a change of a particular configuration at the child of the IAB-node, e.g., in case the RRC connection is re-established with the source path.

In some aspects, the first message or the second message may carry an IP address configuration for changing the IAB-donor-DU, a BAP configuration, e.g., BAP routing configuration or UL mapping configuration or channel mapping configuration or BAP address allocation that corresponds to the change of upstream in the topology, a security key update for changing the IAB-donor-CU, a handover command for changing the IAB-donor-CU, etc.

In some aspects, the first message or the second message may be sent on the F1 application protocol (F1-AP) message, and the first message and the second message may be sent using the same F1-AP message or different F1-AP messages. In one aspect, the plurality of messages may be transmitted on the single F1-AP message. Accordingly, the first message or the second message may be included in containers in the F1-AP message, e.g., RRC container. That is, the IAB-node may not know the content of the plurality of messages, and the plurality of messages may be included in the RRC containers for selective transmission to the child of the IAB-node. The F1-AP message may include a UE context setup request message, a UE context setup modification message, or a DL RRC message transfer message.

In another aspect, the plurality of messages may be sent on different F1-AP messages. To accommodate transmitting the plurality of messages on different F1-AP messages with the same PDCP SN, the RRC integrity protection may be relaxed to allow transmission of different F1-AP messages with the same PDCP SN to the respective parent IAB-nodes.

In some aspects, The IAB-node may receive a reconfiguration message to perform a random access procedure. That is, the IAB-node may receive a reconfiguration message from the IAB-donor to perform the random access procedure to handover the connection from the source path to a target path. The first condition may be the success or failure of the random access procedure, e.g., handover or SN change. That is, the first condition may be associated with the success or failure of the random access procedure instructed by the reconfiguration message received from the IAB-donor.

The IAB-node may receive a reconfiguration message to switch to a target cell served by a candidate parent node. That is, the IAB-node may not be directly performing the handover process but may receive the reconfiguration message from the parent IAB-node based on the change of the path. The reconfiguration message may instruct to switch to the target cell served by the candidate parent node. The first condition may be based on the identifier (ID) of the IAB-donor-CU associated with the target cell or the ID of the IAB-donor-DU via which the parent node that holds the target cell that connects to backhauls traffic between the IAB-node and the IAB-donor-CU. That is, the IAB-node may receive the reconfiguration message to connect to a target cell, and from the ID of the IAB-donor-CU associated with the target cell and/or the ID of the IAB-donor-DU via which the parent node that holds the target cell that connects to backhauls traffic between the IAB-node and the IAB-donor-CU, the IAB-node may infer whether the IAB-donor-CU and/or the IAB-donor-DU has changed, and therefore, may determine whether the first condition occurred or not.

In some aspects, the IAB-node may perform re-establishment of a connection, e.g., the RRC re-establishment following a radio link failure or handover failure. The IAB-node may connect to a cell served by the parent node. The first condition may be based on the ID of the IAB-donor-CU associated with the cell, e.g., same or different IAB-donor-CU as before the re-establishment, or the ID of the IAB-donor-DU via which the parent node that holds the cell connects to the IAB-donor-CU, e.g., same or different IAB-donor-DU of the same IAB-donor as before the re-establishment. That is, the IAB-node may re-establish the RRC connection and connect to the cell, and from the ID of the IAB-donor-CU associated with the cell and/or the ID of the IAB-donor-DU via which the parent node that holds the cell connects to the IAB-donor-CU, the IAB-node may infer whether the IAB-donor-CU and/or the IAB-donor-DU has changed, and therefore, may determine whether the first condition occurred or not.

In some aspects, the IAB-donor-CU may be identified from the cell ID, e.g., an NR cell identity (NCI) or an NR cell global identity (NCGI), a cell broadcast which may include the donor-ID of the IAB-donor or a base station CU ID on the F1 connection. In some aspects, the IAB-donor-DU may be identified based on a BAP address or TNL address info, including the IP address that is anchored at the IAB-donor-DU and used by the IAB-node for its F1 connection to the IAB-donor-CU.

Various forms of conditions may be provided to instruct the IAB-node to forward the RRC reconfiguration message to the child of the IAB-node. In some aspects, the first condition may be receiving an indication to forward the first message. That is, the first condition may be receiving the explicit indication to forward the first message among the plurality of messages, and the IAB-node may determine that the first condition occurred based on receiving the indication from the IAB-donor-CU to forward the first message to the child of the IAB-node. The indication may be an RRC message or F1-AP message or a MAC-CE or DCI, and the indication may be sent from a parent IAB-node of the IAB-node, the IAB-donor-CU or a second IAB-donor-CU in case there was a change of the IAB-donor-CU.

In some aspects, the first condition may be receipt of a dummy message, which is a message that triggers no change of a particular configuration at the IAB-node. The dummy message may indicate that the source path was not switched to the target path, and therefore, the IAB-node and the child of the IAB-node may maintain the current configuration. The dummy message received for the IAB-node may also trigger the release of the dummy message for the child of the IAB-node.

In some aspects, the first condition may be receipt of a reconfiguration message for the IAB-node. The reconfiguration message may include an IP address configuration for changing the IAB-donor-DU, a BAP configuration, e.g., BAP routing configuration or UL mapping configuration or channel mapping configuration or BAP address allocation that corresponds to the change of upstream in the topology, a security key update for changing the IAB-donor-CU, a handover command for changing the IAB-donor-CU, etc.

In some aspects, the IAB-node may receive a reconfiguration message that provides the TNL info, including the IP address, to migrate a signaling connection, e.g., an F1-C for the control plane, or redirect a data tunnel, e.g., an F1-U for the user plane, onto a path that holds an IAB-donor-DU. The first condition may be based on an ID of the IAB-donor-DU or an ID of a donor-CU associated with the IAB-donor-DU. In one aspect, the IDs may be the BAP-associated IDs or IDs on the F1 connection.

In some aspects, the IAB-node may receive a BAP configuration message, e.g., UL mapping, associated with an IAB-donor-DU. For example, the IAB-node may receive a BAP configuration message from the IAB-donor-CU to map the traffic from the child of the IAB-node to the IAB-donor-DU. The IAB-node may infer the establishment of the path to the network, including the IAB-donor-DU. Accordingly, the first condition may be based on the ID of the IAB-donor-DU or the ID of a donor-CU associated with the IAB-donor-DU.

In some aspects, the first condition and the second condition may be dependent. For example, the second condition may be satisfied if the first condition fails.

Figure 10:
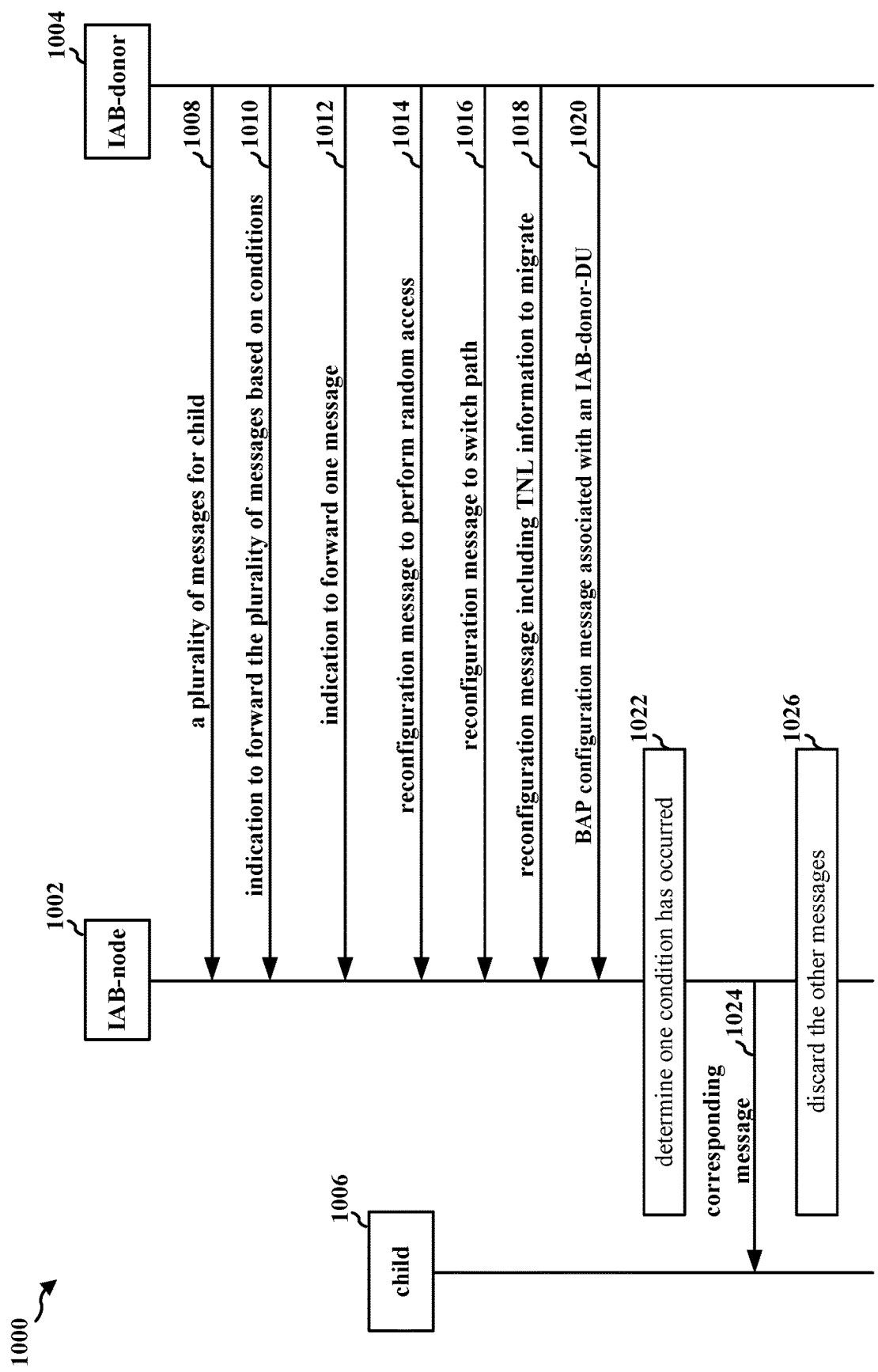
FIG. 10 is a communication flow diagram of a method of wireless communication.

FIG. 10 is a communication flow diagram 1000 of a method of wireless communication. The communication flow diagram 1000 may include an IAB-node 1002, an IAB-donor 1004, and a child 1006 of the IAB-node 1002. The IAB-donor 1004 may transmit, to the IAB-node 1002, a plurality of messages for a child 1006 of the IAB-node 1002, the plurality of messages including a first message being associated with a first condition, and a second message being associated with a second condition, and transmit an indication instructing the IAB to forward, to the child 1006, the first message if a first condition is met or the second message if a second condition is met. The IAB-node 1002 may receive, from the IAB-donor 1004, the indication, determine that one condition among the first condition and the second condition has occurred, forward one of the first message or the second message to the child 1006 based on the occurrence of the one condition, and discard the other of the first message or the second message.

At 1008, the IAB-donor 1004 may transmit, to the IAB-node 1002, a plurality of messages for the child 1006, the plurality of messages including a first message being associated with a first condition, and a second message being associated with a second condition via a source path established between the IAB-node 1002 and a network, the source path including the IAB-donor-CU and a first IAB-donor-DU. The IAB-node 1002 may receive, from the IAB-donor-CU, the plurality of message including the first message and the second message for the child 1006 through the source path established between the IAB-node 1002 and the network. In some aspects, the plurality of messages may be associated with the same PDCP SN. In some aspects, the plurality of messages may be received in one or more containers of a single message. In some aspects, the first message and the second message may be individually transmitted and received, and both the first message and the second message may be associated with the same PDCP SN. In one aspect, the first message or the second message may be sent on F1-AP messages.

In one aspect, the first message may trigger a change in a configuration of the child 1006 to be associated with a first target path, and the first message may be an RRC message for at least one of an RRC reconfiguration, an RRC re-establishment, an RRC release, or an RRC setup.

At 1010, the IAB-donor 1004 may transmit an instructing the IAB to forward, to the child 1006, the first message if a first condition is met or the second message if a second condition is met. The IAB-node 1002 may receive an indication to forward the first message to the child 1006 if a first condition is met and to forward the second message to the child 1006 if a second condition is met. In one aspect, the indication may also indicate the IAB-node 1002 to withhold the first message and the second message until the occurrence of a respective condition.

In one aspect, the first condition may be associated with switching a path between the IAB-node 1002 and the network from the source path to the first target path different from the source path, and the first message received from the first IAB-donor-CU may be forwarded to the child 1006 based on the successful switching of the path between the IAB-node 1002 and the network from the source path to the first target path. The first target path may include at least one of a second IAB-donor-CU different from the first IAB-donor-CU or a second IAB-donor-DU different from the first IAB-donor-DU.

In one aspect, the second condition may be associated with maintaining the path between the IAB-node 1002 and the network as the source path, and the second message may be forwarded, to the child 1006, based on determining that the second condition has occurred. The second message may be a message that triggers no change in a configuration of the child 1006, i.e., a dummy message.

At 1012, the IAB-donor 1004 may transmit an indication to forward the first message to the child 1006. The IAB-node 1002 may receive an indication to forward the first message. The indication may be transmitted or received in an F1-AP message, an RRC message, a MAC-CE, DCI, or a BAP message. In some aspects, the first condition may be based on receiving an indication to forward the first message, and the IAB-node 1002 may forward the first message received from the first IAB-donor-CU to the child 1006 based on the received indication At 1014, the IAB-donor 1004 may transmit a reconfiguration message to perform a random access procedure, where at least one of the first condition or the second condition may be based on successfully performing the random access procedure. The IAB-node 1002 may receive a reconfiguration message to perform a random access procedure. In some aspects, at least one of the first condition or the second condition may be based on successfully performing the random access procedure.

At 1016, the IAB-donor 1004 may transmit a reconfiguration message to switch to a target path on a target cell served by a candidate parent node. The IAB-node 1002 may receive a reconfiguration message to switch to a target path on a target cell served by a candidate parent node. In some aspect, the first condition may be based on the path between the IAB-node 1002 and the network being successfully switched from the source path to the target path based on the received reconfiguration message, and the IAB-node 1002 may forward the first message to the child 1006 based on the occurrence of the first condition. The reconfiguration message may include at least one of an ID of the IAB-donor-CU associated with the target cell, an ID of an IAB-donor-DU via which the parent node that provides the target cell that backhauls traffic between the IAB-node 1002 and the IAB-donor-CU. The first condition may be determined based on at least one of an ID of an IAB-donor-CU associated with the target cell or an ID of an IAB-donor-DU via which the parent node holds the first target cell and backhauls traffic between the IAB-node 1002 and the IAB-donor-CU.

At 1018, the IAB-donor 1004 may transmit a reconfiguration message including TNL information to migrate a signaling connection onto the path holding an IAB-donor-DU. The IAB-node 1002 may receive a reconfiguration message including TNL information to migrate a signaling connection onto the path holding an IAB-donor-DU. In some aspects, the first condition may be based on at least one of an ID of the IAB-donor-DU or an ID of the IAB-donor-CU associated with the IAB-donor-DU.

At 1020, the IAB-donor 1004 may transmit a BAP configuration message associated with an IAB-donor-DU. The IAB-node 1002 may receive a BAP configuration message associated with an IAB-donor-DU. In some aspects, the first condition may be based on at least one of an ID of the IAB-donor-DU or an ID of the IAB-donor-CU associated with the IAB-donor-DU.

At 1022, the IAB-node 1002 may determine that one condition among the first condition and the second condition has occurred. The child 1006 may be one of a child IAB-node or UE.

At 1024, the IAB-node 1002 may forward one of the first message or the second message, e.g., the message corresponding to the condition that occurred, to the child 1006 based on an occurrence of the one condition.

At 1026, the IAB-node 1002 may discard the other of the first message or the second message, e.g., corresponding to a condition that did not occur.

In one aspect, the plurality of messages may include a third message associated with a third condition relating to a change in a configuration of the child 1006 associated with a second target path different from the source path and the first target path. The IAB-node 1002 may determine that the third condition has occurred, forward to the child 1006, the third message received from the first IAB-donor-CU, and discard the first message and the second message.

Figure 11:
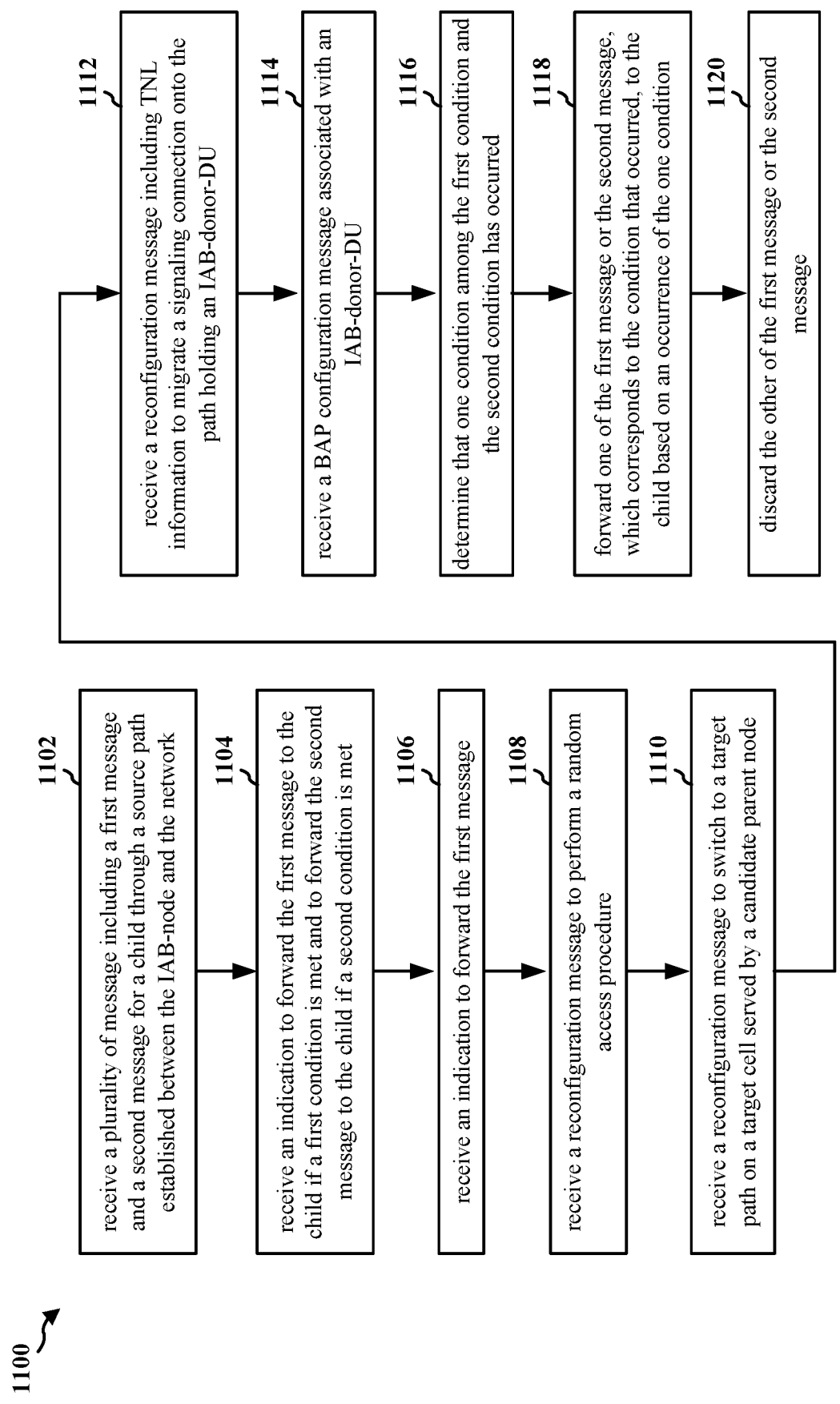
FIG. 11 is a flowchart of a method of wireless communication.

FIG. 11 is a flowchart 1100 of a method of wireless communication. The method may be performed by a base station (e.g., the base station 102/180; the IAB-node 420/ 520a/520b/606a/606b/606c/720/730/740/820/830/840/920/ 930/940/1002; the apparatus 1502). The base station may be an IAB-node. The IAB-node may receive, from the IAB-donor, a plurality of messages for a child of the IAB-node, the plurality of messages including a first message being associated with a first condition, and a second message being associated with a second condition. The IAB-node may receive, from the IAB-donor-CU, the indication, determine that one condition among the first condition and the second condition has occurred, forward one of the first message or the second message to the child based on the occurrence of the one condition, and discard the other of the first message or the second message.

At 1102, the IAB-node may receive, from an IAB-donor-CU, a plurality of message including a first message and a second message for a child through a source path established between the IAB-node and the network. In some aspects, the plurality of messages may be associated with the same PDCP SN. In some aspects, the plurality of messages may be received in one or more containers of a single message. In some aspects, the first message and the second message may be individually transmitted and received, and both the first message and the second message may be associated with the same PDCP SN. In one aspect, the first message or the second message may be sent on F1-AP messages. In one aspect, the first message may trigger a change in a configuration of the child to be associated with a first target path, and the first message may be an RRC message for at least one of an RRC reconfiguration, an RRC re-establishment, an RRC release, or an RRC setup. For example, at 1008, the IAB-node 1002 may receive, from the IAB-donor-CU, the plurality of message including the first message and the second message for the child 1006 through the source path established between the IAB-node 1002 and the network. Furthermore, 1102 may be performed by an RRC reconfiguration message managing component 1540.

At 1104, the IAB-node may receive an indication to forward the first message to the child if a first condition is met and to forward the second message to the child if a second condition is met. In one aspect, the indication may also indicate the IAB-node to withhold the first message and the second message until the occurrence of a respective condition. In one aspect, the first condition may be associated with switching a path between the IAB-node and the network from the source path to the first target path different from the source path, and the first message received from the IAB-node may be forwarded to the child based on the successful switching of the path between the IAB-node and the network from the source path to the first target path. The first target path may include at least one of a second IAB-donor-CU different from the first IAB-donor-CU or a second IAB-donor-DU different from the first IAB-donor-DU. In one aspect, the second condition may be associated with maintaining the path between the IAB-node and the network as the source path, and the second message may be forwarded, to the child, based on determining that the second condition has occurred. The second message may be a message that triggers no change in a configuration of the child, i.e., a dummy message. For example, at 1010, the IAB-node 1002 may receive an indication to forward the first message to the child 1006 if a first condition is met and to forward the second message to the child 1006 if a second condition is met. Furthermore, 1104 may be performed by the RRC reconfiguration message managing component 1540.

At 1106, the IAB-node may receive an indication to forward the first message. The indication may be transmitted or received in an F1-AP message, an RRC message, a MAC-CE, DCI, or a BAP message. In some aspects, the first condition may be based on receiving an indication to forward the first message, and the IAB-node may forward the first message received from the first IAB-donor-CU to the child based on the received indication. For example, at 1012, the IAB-node 1002 may receive an indication to forward the first message. Furthermore, 1106 may be performed by the RRC reconfiguration message managing component 1540.

At 1108, the IAB-node may receive a reconfiguration message to perform a random access procedure. In some aspects, at least one of the first condition or the second condition may be based on successfully performing the random access procedure. For example, at 1014, the IAB-node 1002 may receive a reconfiguration message to perform a random access procedure. Furthermore, 1108 may be performed by the RRC reconfiguration message managing component 1540.

At 1110, the IAB-node may receive a reconfiguration message to switch to a target path on a target cell served by a candidate parent node. In some aspect, the first condition may be based on the path between the IAB-node and the network being successfully switched from the source path to the target path based on the received reconfiguration message, and the IAB-node may forward the first message to the child based on the occurrence of the first condition. The reconfiguration message may include at least one of an ID of the IAB-donor-CU associated with the target cell, an ID of an IAB-donor-DU via which the parent node that provides the target cell that backhauls traffic between the IAB-node and the IAB-donor-CU. The first condition may be determined based on at least one of an ID of an IAB-donor-CU associated with the target cell or an ID of an IAB-donor-DU via which the parent node holds the first target cell and backhauls traffic between the IAB-node and the IAB-donor-CU. For example, at 1016, the IAB-node 1002 may receive a reconfiguration message to switch to a target path on a target cell served by a candidate parent node. Furthermore, 1110 may be performed by the RRC reconfiguration message managing component 1540.

At 1112, the IAB-node may receive a reconfiguration message including TNL information to migrate a signaling connection onto the path holding an IAB-donor-DU. In some aspects, the first condition may be based on at least one of an ID of the IAB-donor-DU or an ID of the IAB-donor-CU associated with the IAB-donor-DU. For example, at 1018, the IAB-node 1002 may receive a reconfiguration message including TNL information to migrate a signaling connection onto the path holding an IAB-donor-DU. Furthermore, 1112 may be performed by the RRC reconfiguration message managing component 1540.

At 1114, the IAB-node may receive a BAP configuration message associated with an IAB-donor-DU. In some aspects, the first condition may be based on at least one of an ID of the IAB-donor-DU or an ID of the IAB-donor-CU associated with the IAB-donor-DU. For example, at 1020, the IAB-node 1002 may receive a BAP configuration message associated with an IAB-donor-DU. Furthermore, 1114 may be performed by the RRC reconfiguration message managing component 1540.

At 1116, the IAB-node may determine that one condition among the first condition and the second condition has occurred. The child may be one of a child IAB-node or UE. For example, at 1022, the IAB-node 1002 may determine that one condition among the first condition and the second condition has occurred. Furthermore, 1116 may be performed by the RRC reconfiguration message managing component 1540.

At 1118, the IAB-node may forward one of the first message or the second message, which corresponds to the condition that occurred, to the child based on an occurrence of the one condition. For example, at 1024, the IAB-node 1002 may forward one of the first message or the second message, e.g., the message corresponding to the condition that occurred, to the child 1006 based on an occurrence of the one condition. Furthermore, 1118 may be performed by the RRC reconfiguration message managing component 1540. At 1120, the IAB-node may be configured to discard the other of the first message or the second message, e.g., corresponding to a condition that did not occur. For example, at 1026, the IAB-node 1002 may discard the other of the first message or the second message, e.g., corresponding to a condition that did not occur. Furthermore, 1120 may be performed by the RRC reconfiguration message managing component 1540.

Figure 12:
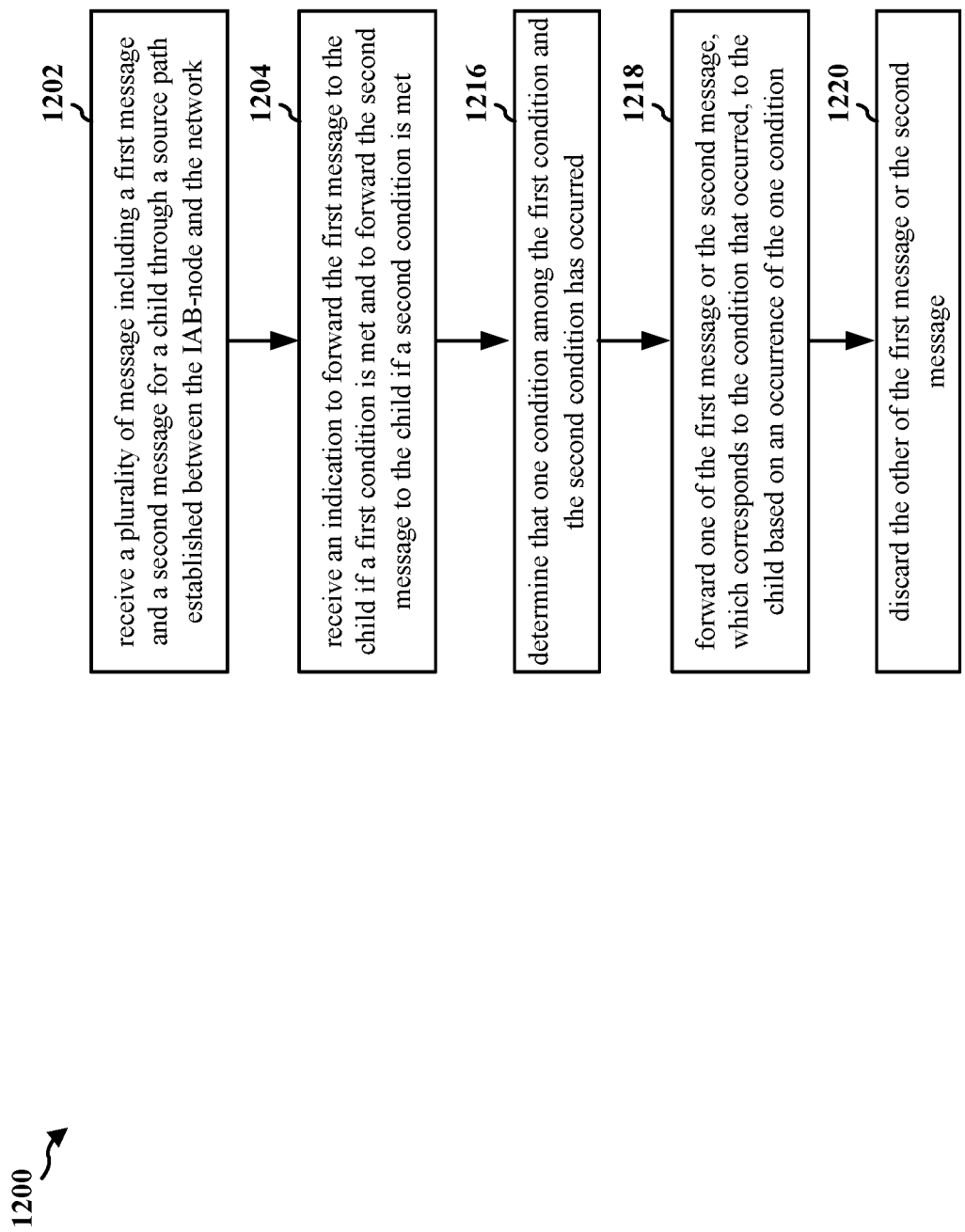
FIG. 12 is a flowchart of a method of wireless communication.

FIG. 12 is a flowchart 1200 of a method of wireless communication. The method may be performed by a base station (e.g., the base station 102/180; the IAB-node 420/ 520a/520b/606a/606b/606c/720/730/740/820/830/840/920/ 930/940/1002; the apparatus 1502). The base station may be an IAB-node. The IAB-node may receive, from the IAB-donor, a plurality of messages for a child of the IAB-node, the plurality of messages including a first message being associated with a first condition, and a second message being associated with a second condition. The IAB-node may receive, from the IAB-donor-CU, the indication, determine that one condition among the first condition and the second condition has occurred, forward one of the first message or the second message to the child based on the occurrence of the one condition, and discard the other of the first message or the second message.

At 1202, the IAB-node may receive, from an IAB-donor-CU, a plurality of message including a first message and a second message for a child through a source path established between the IAB-node and the network. In some aspects, the plurality of messages may be associated with the same PDCP SN. In some aspects, the plurality of messages may be received in one or more containers of a single message. In some aspects, the first message and the second message may be individually transmitted and received, and both the first message and the second message may be associated with the same PDCP SN. In one aspect, the first message or the second message may be sent on F1-AP messages. In one aspect, the first message may trigger a change in a configuration of the child to be associated with a first target path, and the first message may be an RRC message for at least one of an RRC reconfiguration, an RRC re-establishment, an RRC release, or an RRC setup. For example, at 1008, the IAB-node 1002 may receive, from the IAB-donor-CU, the plurality of message including the first message and the second message for the child 1006 through the source path established between the IAB-node 1002 and the network. Furthermore, 1202 may be performed by an RRC reconfiguration message managing component 1540.

At 1204, the IAB-node may receive an indication to forward the first message to the child if a first condition is met and to forward the second message to the child if a second condition is met. In one aspect, the indication may also indicate the IAB-node to withhold the first message and the second message until the occurrence of a respective condition. In one aspect, the first condition may be associated with switching a path between the IAB-node and the network from the source path to the first target path different from the source path, and the first message received from the IAB-node may be forwarded to the child based on the successful switching of the path between the IAB-node and the network from the source path to the first target path. The first target path may include at least one of a second IAB-donor-CU different from the first IAB-donor-CU or a second IAB-donor-DU different from the first IAB-donor-DU. In one aspect, the second condition may be associated with maintaining the path between the IAB-node and the network as the source path, and the second message may be forwarded, to the child, based on determining that the second condition has occurred. The second message may be a message that triggers no change in a configuration of the child, i.e., a dummy message. For example, at 1010, the IAB-node 1002 may receive an indication to forward the first message to the child 1006 if a first condition is met and to forward the second message to the child 1006 if a second condition is met. Furthermore, 1204 may be performed by the RRC reconfiguration message managing component 1540.

At 1216, the IAB-node may determine that one condition among the first condition and the second condition has occurred. The child may be one of a child IAB-node or UE. For example, at 1022, the IAB-node 1002 may determine that one condition among the first condition and the second condition has occurred. Furthermore, 1216 may be performed by the RRC reconfiguration message managing component 1540.

At 1218, the IAB-node may forward one of the first message or the second message, which corresponds to the condition that occurred, to the child based on an occurrence of the one condition. For example, at 1024, the IAB-node 1002 may forward one of the first message or the second message, e.g., the message corresponding to the condition that occurred, to the child 1006 based on an occurrence of the one condition. Furthermore, 1218 may be performed by the RRC reconfiguration message managing component 1540.

At 1220, the IAB-node may discard the other of the first message or the second message, e.g., corresponding to a condition that did not occur. For example, at 1026, the IAB-node 1002 may discard the other of the first message or the second message, e.g., corresponding to a condition that did not occur. Furthermore, 1220 may be performed by the RRC reconfiguration message managing component 1540.

Figure 13:
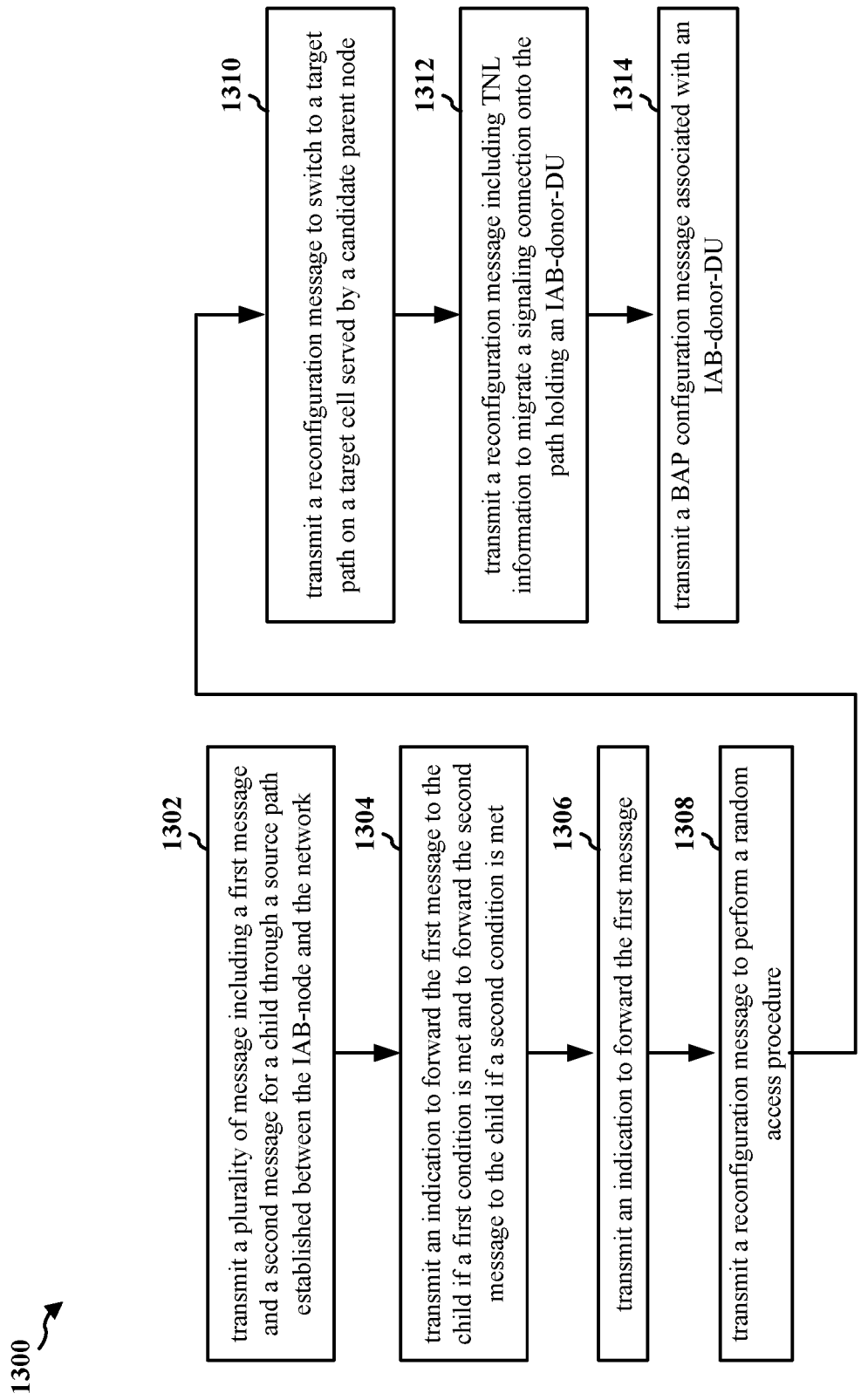
FIG. 13 is a flowchart of a method of wireless communication.

FIG. 13 is a flowchart 1300 of a method of wireless communication. The method may be performed by a base station (e.g., the IAB-donor 103/410/510/602/702/802/902/ 1004; the apparatus 1602). The base station may be an IAB-donor including an IAB-donor-CU. The IAB-donor may transmit, to the IAB-node, a plurality of messages for a child of the IAB-node, the plurality of messages including a first message being associated with a first condition, and a second message being associated with a second condition, and transmit an indication instructing the IAB to forward, to the child, the first message if a first condition is met or the second message if a second condition is met.

At 1302, the IAB-donor-CU may transmit, to a IAB-node, a plurality of messages for the child, the plurality of messages including a first message being associated with a first condition, and a second message being associated with a second condition via a source path established between the IAB-node and a network, the source path including the IAB-donor-CU and a first IAB-donor-DU (i.e., as at 1008). In some aspects, the plurality of messages may be associated with the same PDCP SN. In some aspects, the plurality of messages may be received in one or more containers of a single message. In some aspects, the first message and the second message may be individually transmitted and received, and both the first message and the second message may be associated with the same PDCP SN. In one aspect, the first message or the second message may be sent on F1-AP messages. In one aspect, the first message may trigger a change in a configuration of the child to be associated with a first target path, and the first message may be an RRC message for at least one of an RRC reconfiguration, an RRC re-establishment, an RRC release, or an RRC setup. For example, at 1008, the IAB-donor 1004 may transmit, to the IAB-node 1002, a plurality of messages for the child 1006, the plurality of messages including a first message being associated with a first condition, and a second message being associated with a second condition via a source path established between the IAB-node 1002 and a network. Furthermore, 1302 may be performed by an RRC reconfiguration message managing component 1640.

At 1304, the IAB-donor-CU may transmit an instructing the IAB to forward, to the child, the first message if a first condition is met or the second message if a second condition is met (i.e., as at 1010). In one aspect, the indication may also indicate the IAB-node to withhold the first message and the second message until the occurrence of a respective condition. In one aspect, the first condition may be associated with switching a path between the IAB-node and the network from the source path to the first target path different from the source path, and the first message received from the first IAB-donor-CU may be forwarded to the child based on the successful switching of the path between the IAB-node and the network from the source path to the first target path. The first target path may include at least one of a second IAB-donor-CU different from the first IAB-donor-CU or a second IAB-donor-DU different from the first IAB-donor-DU. In one aspect, the second condition may be associated with maintaining the path between the IAB-node and the network as the source path, and the second message may be forwarded, to the child, based on determining that the second condition has occurred. The second message may be a message that triggers no change in a configuration of the child, i.e., a dummy message. For example, at 1010, the IAB-donor 1004 may transmit an instructing the IAB to forward, to the child 1006, the first message if a first condition is met or the second message if a second condition is met. Furthermore, 1304 may be performed by the RRC reconfiguration message managing component 1640.

At 1306, the IAB-donor-CU may transmit an indication to forward the first message to the child (i.e., as at 1012). The indication may be transmitted or received in an FL-AP message, an RRC message, a MAC-CE, DCI, or a BAP message. In some aspects, the first condition may be based on receiving an indication to forward the first message, and the IAB-node may forward the first message received from the first IAB-donor-CU to the child based on the received indication. For example, at 1012, the IAB-donor 1004 may transmit an indication to forward the first message to the child 1006. Furthermore, 1306 may be performed by the RRC reconfiguration message managing component 1640.

At 1308, the IAB-donor-CU may transmit a reconfiguration message to perform a random access procedure (i.e., as at 1014). In some aspects, at least one of the first condition or the second condition may be based on successfully performing the random access procedure. For example, at 1014, the IAB-donor 1004 may transmit a reconfiguration message to perform a random access procedure, where at least one of the first condition or the second condition may be based on successfully performing the random access procedure. Furthermore, 1308 may be performed by the RRC reconfiguration message managing component 1640.

At 1310, the IAB-donor-CU may transmit a reconfiguration message to switch to a target path on a target cell served by a candidate parent node (i.e., as at 1016). In some aspect, the first condition may be based on the path between the IAB-node and the network being successfully switched from the source path to the target path based on the received reconfiguration message, and the IAB-node may forward the first message to the child based on the occurrence of the first condition. The reconfiguration message may include at least one of an ID of the IAB-donor-CU associated with the target cell, an ID of an IAB-donor-DU via which the parent node that provides the target cell that backhauls traffic between the IAB-node and the IAB-donor-CU. The first condition may be determined based on at least one of an ID of an IAB-donor-CU associated with the target cell or an ID of an IAB-donor-DU via which the parent node holds the first target cell and backhauls traffic between the IAB-node and the IAB-donor-CU. For example, at 1016, the IAB-donor 1004 may transmit a reconfiguration message to switch to a target path on a target cell served by a candidate parent node. Furthermore, 1310 may be performed by the RRC reconfiguration message managing component 1640.

At 1312, the IAB-donor-CU may transmit a reconfiguration message including TNL information to migrate a signaling connection onto the path holding an IAB-donor-DU. In some aspects, the first condition may be based on at least one of an ID of the IAB-donor-DU or an ID of the IAB-donor-CU associated with the IAB-donor-DU. For example, at 1018, the IAB-donor 1004 may transmit a reconfiguration message including TNL information to migrate a signaling connection onto the path holding an IAB-donor-DU. Furthermore, 1312 may be performed by the RRC reconfiguration message managing component 1640.

At 1314, the IAB-donor-CU may transmit a BAP configuration message associated with an IAB-donor-DU. In some aspects, the first condition may be based on at least one of an ID of the IAB-donor-DU or an ID of the IAB-donor-CU associated with the IAB-donor-DU. For example, at 1020, the IAB-donor 1004 may transmit a BAP configuration message associated with an IAB-donor-DU. Furthermore, 1314 may be performed by the RRC reconfiguration message managing component 1640.

Figure 14:
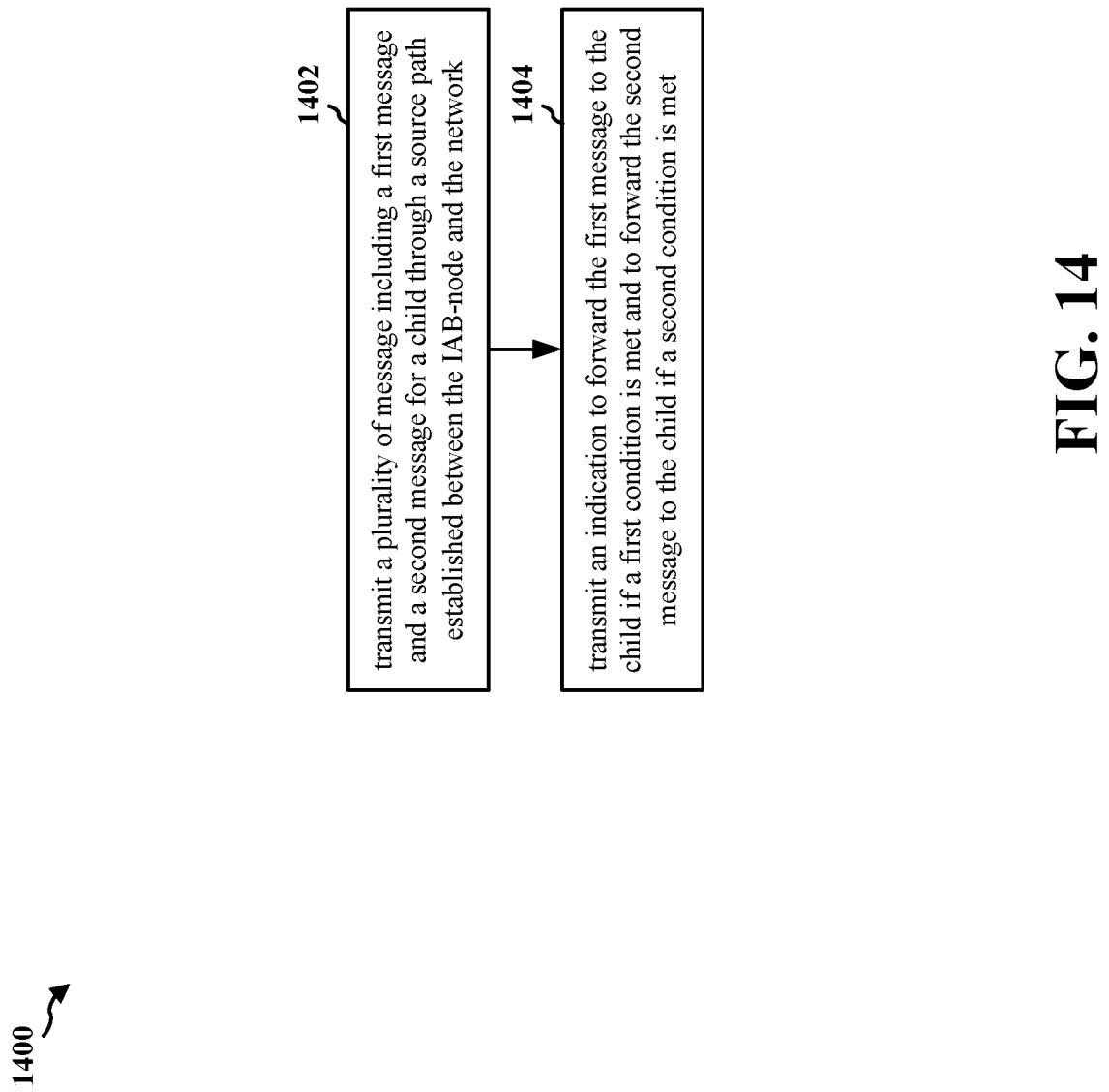
FIG. 14 is a flowchart of a method of wireless communication.

FIG. 14 is a flowchart 1400 of a method of wireless communication. The method may be performed by a base station (e.g., the IAB-donor 103/410/510/602/702/802/902/1004; the apparatus 1602). The base station may be an IAB-donor including an IAB-donor-CU. The IAB-donor may transmit, to the IAB-node, a plurality of messages for a child of the IAB-node, the plurality of messages including a first message being associated with a first condition, and a second message being associated with a second condition, and transmit an indication instructing the IAB to forward, to the child, the first message if a first condition is met or the second message if a second condition is met.

At 1402, the IAB-donor-CU may transmit, to a IAB-node, a plurality of messages for the child, the plurality of messages including a first message being associated with a first condition, and a second message being associated with a second condition via a source path established between the IAB-node and a network, the source path including the IAB-donor-CU and a first IAB-donor-DU (i.e., as at 1008).

In some aspects, the plurality of messages may be associated with the same PDCP SN. In some aspects, the plurality of messages may be received in one or more containers of a single message. In some aspects, the first message and the second message may be individually transmitted and received, and both the first message and the second message may be associated with the same PDCP SN. In one aspect, the first message or the second message may be sent on F1-AP messages. In one aspect, the first message may trigger a change in a configuration of the child to be associated with a first target path, and the first message may be an RRC message for at least one of an RRC reconfiguration, an RRC re-establishment, an RRC release, or an RRC setup. For example, at 1008, the IAB-donor 1004 may transmit, to the IAB-node 1002, a plurality of messages for the child 1006, the plurality of messages including a first message being associated with a first condition, and a second message being associated with a second condition via a source path established between the IAB-node 1002 and a network. Furthermore, 1402 may be performed by an RRC reconfiguration message managing component 1640.

At 1404, the IAB-donor-CU may transmit an instructing the IAB to forward, to the child, the first message if a first condition is met or the second message if a second condition is met (i.e., as at 1010). In one aspect, the indication may also indicate the IAB-node to withhold the first message and the second message until the occurrence of a respective condition. In one aspect, the first condition may be associated with switching a path between the IAB-node and the network from the source path to the first target path different from the source path, and the first message received from the first IAB-donor-CU may be forwarded to the child based on the successful switching of the path between the IAB-node and the network from the source path to the first target path. The first target path may include at least one of a second IAB-donor-CU different from the first IAB-donor-CU or a second IAB-donor-DU different from the first IAB-donor-DU. In one aspect, the second condition may be associated with maintaining the path between the IAB-node and the network as the source path, and the second message may be forwarded, to the child, based on determining that the second condition has occurred. The second message may be a message that triggers no change in a configuration of the child, i.e., a dummy message. For example, at 1010, the IAB-donor 1004 may transmit an instructing the IAB to forward, to the child 1006, the first message if a first condition is met or the second message if a second condition is met. Furthermore, 1404 may be performed by the RRC reconfiguration message managing component 1640.

Figure 15:
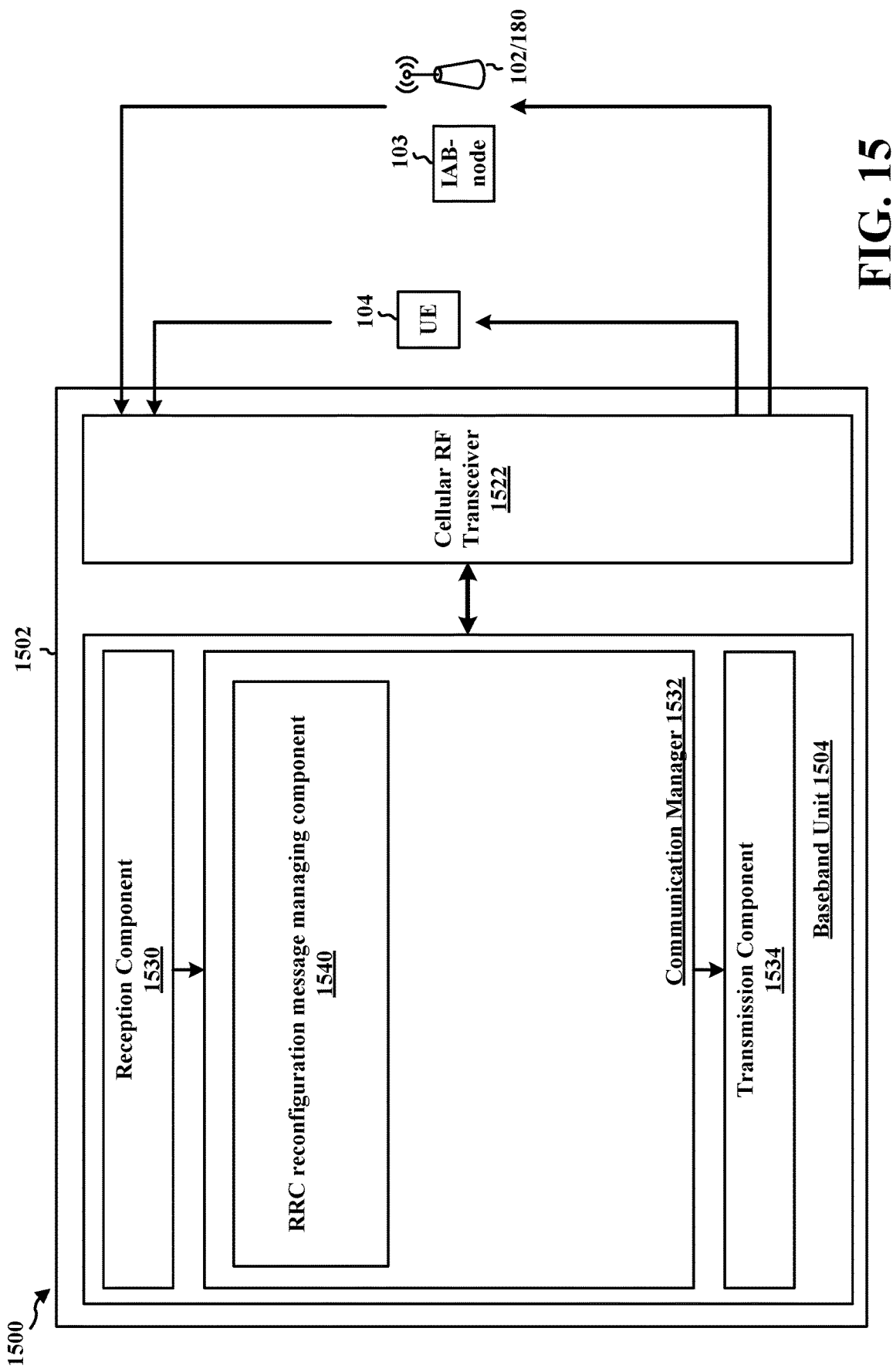
FIG. 15 is a diagram illustrating an example of a hardware implementation for an example apparatus.

FIG. 15 is a diagram 1500 illustrating an example of a hardware implementation for an apparatus 1502. The apparatus 1502 may be an IAB-node or a component of an IAB-node and may include a baseband unit 1504. The baseband unit 1504 may communicate through a cellular RF transceiver with one or more UEs 104. The baseband unit 1504 may also communicate through a cellular RF transceiver 1522 with one or more IAB-donors 103. The IAB-donor 103 may be a parent node of the apparatus or may be a child node of the apparatus. The IAB-donor 103 may include an IAB-donor-CU. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the IAB-node 310 and may include the memory 376 and/or at least one of the TX processor 316, the RX processor 370, and the controller/processor 375.

The communication manager 1532 includes an RRC reconfiguration message managing component 1540 that is configured to receive, from an IAB-donor-CU, a plurality of message including a first message and a second message for a child through a source path established between the IAB-node and the network, receive an indication to forward the first message to the child if a first condition is met and to forward the second message to the child if a second condition is met, receive an indication to forward the first message, receive a reconfiguration message to perform a random access procedure, receive a reconfiguration message to switch to a target path on a target cell served by a candidate parent node, receive a reconfiguration message including TNL information to migrate a signaling connection onto the path holding an IAB-donor-DU, receive a BAP configuration message associated with an IAB-donor-DU, determine that one condition among the first condition and the second condition has occurred, forward one of the first message or the second message, which corresponds to the condition that occurred, to the child based on an occurrence of the one condition, and discard the other of the first message or the second message, e.g., corresponding to a condition that did not occur, e.g., as described in connection with 1102, 1104, 1106, 1108, 1110, 1112, 1114, 1116, 1118, 1120, 1202, 1204, 1216, 1218, and 1220.

The apparatus may include additional components that perform each of the blocks of the algorithm in the aforementioned flowcharts of FIGS. 10, 11, and 12. As such, each block in the aforementioned flowcharts of FIGS. 10, 11, and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for receiving a plurality of message including a first message and a second message for a child through a source path established between the IAB-node and a network, the source path including the first IAB-donor-CU and a first IAB-donor-DU, means for receiving an indication to forward the first message to the child if a first condition is met and to forward the second message to the child if a second condition is met, means for determining that one condition among the first condition and the second condition has occurred, means for forwarding one of the first message or the second message to the child based on an occurrence of the one condition, and means for discarding the other of the first message or the second message. The apparatus 1502 may include means for determining that the third condition has occurred, means for forwarding, to the child, the third message received from the first IAB-donor-CU, based on the determination that the third condition has occurred, and means for discarding the first message and the second message. The apparatus 1502 may include means for forwarding, to the child, the second message received from the first IAB-donor-CU, based on maintaining the path between the IAB-node and the network as the source path. The apparatus 1502 may include means for receiving a reconfiguration message to perform a random access procedure, means for receiving a reconfiguration message to switch to a target path on a target cell served by a candidate parent node, means for receiving an indication to forward the first message, means for receiving a reconfiguration message including TNL information to migrate a signaling connection onto the path holding an IAB-donor-DU, and means for receiving a BAP configuration message associated with an IAB-donor-DU. The aforementioned means may be one or more of the aforementioned components of the apparatus 1502 configured to perform the functions recited by the aforementioned means. As described supra, the apparatus 1502 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 16:
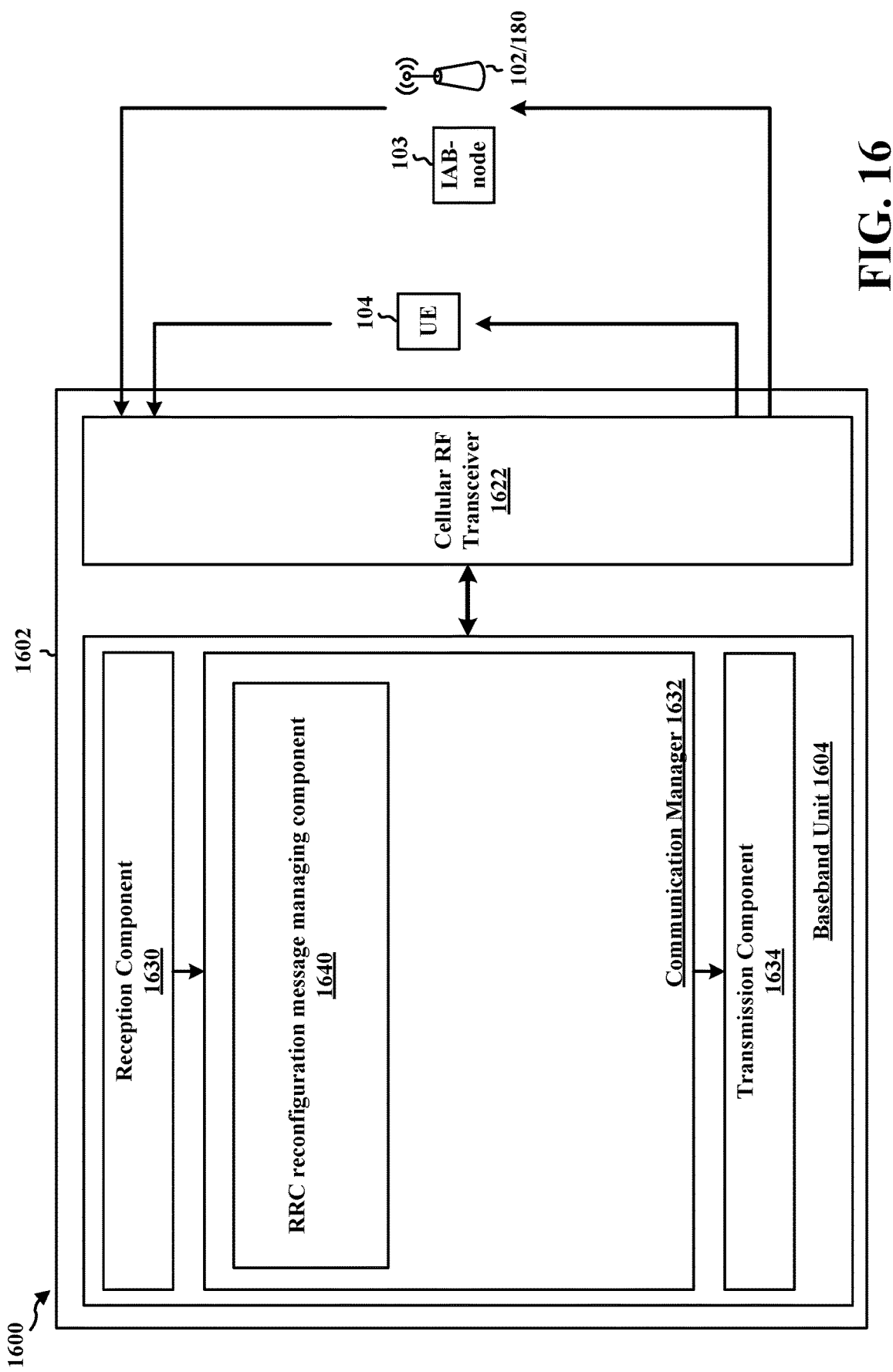
FIG. 16 is a diagram illustrating an example of a hardware implementation for an example apparatus.

FIG. 16 is a diagram 1600 illustrating an example of a hardware implementation for an apparatus 1602. The apparatus 1602 may be an IAB-node or a component of an IAB-node and may include a baseband unit 1604. The apparatus 1602 may be an IAB-donor 103 including an IAB-donor-CU. The baseband unit 1604 may communicate through a cellular RF transceiver with one or more UEs 104. The baseband unit 1604 may also communicate through a cellular RF transceiver 1622 with one or more IAB-nodes including the base station 102. The IAB-node may be a parent node of the apparatus or may be a child node of the apparatus. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the IAB-node 310 and may include the memory 376 and/or at least one of the TX processor 316, the RX processor 370, and the controller/processor 375.

The communication manager 1632 includes an RRC reconfiguration message managing component 1640 that is configured to transmit, to a IAB-node, a plurality of messages for the child, the plurality of messages including a first message being associated with a first condition, and a second message being associated with a second condition via a source path established between the IAB-node and a network, the source path including the IAB-donor-CU and a first IAB-donor-DU, transmit an instructing the IAB to forward, to the child, the first message if a first condition is met or the second message if a second condition is met, transmit an indication to forward the first message to the child, transmit a reconfiguration message to perform a random access procedure, transmit a reconfiguration message to switch to a target path on a target cell served by a candidate parent node, transmit a reconfiguration message including TNL information to migrate a signaling connection onto the path holding an IAB-donor-DU, and transmit a BAP configuration message associated with an IAB-donor-DU, e.g., as described in connection with 1302, 1304, 1306, 1308, 1310, 1312, 1314, 1402, and 1404.

The apparatus may include additional components that perform each of the blocks of the algorithm in the aforementioned flowcharts of FIGS. 10, 13, and 14. As such, each block in the aforementioned flowcharts of FIGS. 10, 13, and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband unit 1604, includes means for transmitting, to an IAB-node, a plurality of messages for a child, the plurality of messages including a first message being associated with a first condition, and a second message being associated with a second condition via a source path established between the IAB-node and a network, the source path including the IAB-donor-CU and a first IAB-donor-DU, and means for transmitting an indication instructing the IAB to forward, to the child, the first message if a first condition is met or the second message if a second condition is met. The apparatus 1602 may include means for indicating the IAB-node to withhold the first message and the second message until an occurrence of a respective condition. The apparatus 1602 may include means for transmitting, to the IAB-node, a reconfiguration message to perform a random access procedure, wherein the at least one of the first condition or the second condition is based on successfully performing the random access procedure, means for transmitting, to the IAB-node, a reconfiguration message to switch to a target path on a target cell served by a candidate parent node. The apparatus 1602 may include means for transmitting an indication to forward the first message to the child, means for transmitting a reconfiguration message including TNL information to migrate a signaling connection onto the path holding an IAB-donor-DU, means for transmitting a BAP configuration message associated with an IAB-donor-DU. The aforementioned means may be one or more of the aforementioned components of the apparatus 1602 configured to perform the functions recited by the aforementioned means. As described supra, the apparatus 1602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

An IAB-donor-CU may transmit, to an IAB-node, a plurality of messages for a child, the plurality of messages including a first message being associated with a first condition, and a second message being associated with a second condition via a source path established between the IAB-node and a network, the source path including the IAB-donor-CU and a first IAB-donor-DU, and transmit an indication instructing the IAB to forward, to the child, the first message if a first condition is met or the second message if a second condition is met.

An IAB-node may receive, from a first IAB-donor-CU, a plurality of message including a first message and a second message for a child through a source path established between the IAB-node and a network, the source path including the first IAB-donor-CU and a first IAB-donor-DU, receive an indication to forward the first message to the child if a first condition is met and to forward the second message to the child if a second condition is met, determine that one condition among the first condition and the second condition has occurred, forward one of the first message or the second message to the child based on an occurrence of the one condition, and discard the other of the first message or the second message.

The first condition may be associated with switching a path between the IAB-node and the network from the source path to a first target path different from the source path, and the first message may be transmitted to the IAB-node, based on a successful switching a path between the IAB-node and the network from the source path to the first target path. The first target path may include at least one of a second IAB-donor-CU different from the IAB-donor-CU or a second IAB-donor-DU different from the first IAB-donor-DU.

The plurality of messages may include a third message associated with a third condition relating to a change in a configuration of the child associated with a second target path different from the source path and the first target path, and the IAB-donor-CU may instruct the IAB-node to forward, to the child, the third message and discard the first message and the second message based on the determination that that the third condition has occurred. The IAB-node may determine that the third condition has occurred, forward, to the child, the third message received from the first IAB-donor-CU, based on the determination that the third condition has occurred, and discard the first message and the second message. The IAB-donor-CU may indicate the IAB-node to withhold the first message and the second message until an occurrence of a respective condition. The child may be one of a child IAB-node or a UE.

The first message may trigger a change in a configuration of the child associated with a first target path, and the first message may be an RRC message for at least one of an RRC reconfiguration, an RRC re-establishment, an RRC release, or an RRC setup. The second message may be a message that triggers no change in a configuration of the child.

The plurality of messages may be associated with a same PDCP SN. The plurality of messages may be transmitted in one or more containers of a single message. The IAB-donor-CU individually may transmit the first message and the second message to the IAB-node, and where both the first message and the second message may be associated with the same PDCP SN. The first message or the second message may be sent on F1-AP messages.

The IAB-donor-CU may transmit, to the IAB-node, a reconfiguration message to perform a random access procedure, where the at least one of the first condition or the second condition may be based on successfully performing the random access procedure. The IAB-donor-CU may transmit, to the IAB-node, a reconfiguration message to switch to a target path on a target cell served by a candidate parent node, where the first condition is based on the path between the IAB-node and the network being successfully switched from the source path to a target path based on the transmitted reconfiguration message.

The reconfiguration message may include at least one of an ID of the IAB-donor-CU associated with a target cell, or an ID of an IAB-donor-DU via which parent node that provides the target cell that backhauls traffic between the IAB-node and the IAB-donor-CU. The first condition may be determined based on at least one of an ID of an IAB-donor-CU associated with the target cell, or an ID of an IAB-donor-DU via which the parent node holds the first target cell and backhauls traffic between the IAB-node and the IAB-donor-CU.

The IAB-donor-CU may transmit an indication to forward the first message to the child, and the first condition may be based on the indication to forward the first message. The IAB-donor-CU may transmit the indication in a F1-AP message, an RRC message, a MAC-CE, DCI, or a BAP message.

The IAB-donor-CU may transmit a reconfiguration message including TNL information to migrate a signaling connection onto the path holding an IAB-donor-DU, where the first condition is based on at least one of an ID of the IAB-donor-DU or an ID of the IAB-donor-CU associated with the IAB-donor-DU. The IAB-donor-CU may transmit a BAP configuration message associated with an IAB-donor-DU, where the first condition is based on at least one of an ID of the IAB-donor-DU or an ID of the IAB-donor-CU associated with the IAB-donor-DU. The second condition may be based on whether the first condition occurs.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of an IAB-node, the method including receiving, from a first IAB-donor-CU, a plurality of message including a first message and a second message for a child through a source path established between the IAB-node and a network, the source path including the first IAB-donor-CU and a first IAB-donor-DU, receiving an indication to forward the first message to the child if a first condition is met and to forward the second message to the child if a second condition is met, determining that one condition among the first condition and the second condition has occurred, forwarding one of the first message or the second message to the child based on an occurrence of the one condition, and discarding the other of the first message or the second message.

Aspect 2 is the method of aspect 1, where the first condition is associated with switching a path between the IAB-node and the network from the source path to a first target path different from the source path, and where the first message received from the first IAB-donor-CU is forwarded to the child based on the successful switching of the path between the IAB-node and the network from the source path to the first target path.

Aspect 3 is the method of aspect 2, where the first target path includes at least one of a second IAB-donor-CU different from the first IAB-donor-CU or a second IAB-donor-DU different from the first IAB-donor-DU.

Aspect 4 is the method of any of aspects 1 to 3, where the plurality of messages includes a third message associated with a third condition relating to a change in a configuration of the child associated with a second target path different from the source path and a first target path associated with the first condition, the method further including determining that the third condition has occurred, forwarding, to the child, the third message received from the first IAB-donor-CU, based on the determination that the third condition has occurred, and discarding the first message and the second message.

Aspect 5 is the method of any of aspects 1 to 4, where the indication indicates the IAB-node to withhold the first message and the second message until the occurrence of a respective condition.

Aspect 6 is the method of any of aspects 1 to 5, where the child is one of a child IAB-node or a UE.

Aspect 7 is the method of any of aspects 1 to 6, where the first message triggers a change in a configuration of the child to be associated with a first target path.

Aspect 8 is the method of any of aspects 1 to 7, where the first message is an RRC message for at least one of an RRC reconfiguration, an RRC re-establishment, an RRC release, or an RRC setup.

Aspect 9 is the method of any of aspects 1 to 8, further including forwarding, to the child, the second message received from the first IAB-donor-CU, based on maintaining the path between the IAB-node and the network as the source path.

Aspect 10 is the method of aspect 9, where the second message is a message that triggers no change in a configuration of the child.

Aspect 11 is the method of any of aspects 1 to 10, where the plurality of messages is associated with a same PDCP SN.

Aspect 12 is the method of aspect 11, where the plurality of messages is received in one or more containers of a single message.

Aspect 13 is the method of aspect 11, where the first message and the second message are individually received, and where both the first message and the second message are associated with the same PDCP SN.

Aspect 14 is the method of any of aspects 1 to 13, where the first message or the second message are sent on F1-AP messages.

Aspect 15 is the method of any of aspects 1 to 14, further including receiving a reconfiguration message to perform a random access procedure, where the at least one of the first condition or the second condition is based on successfully performing the random access procedure.

Aspect 16 is the method of any of aspects 1 to 14, further including receiving a reconfiguration message to switch to a target path on a target cell served by a candidate parent node, where the first condition is based on the path between the IAB-node and the network being successfully switched from the source path to the target path based on the received reconfiguration message, and where the IAB-node forwards the first message to the child based on the occurrence of the first condition.

Aspect 17 is the method of aspect 16, where the received reconfiguration message includes at least one of an ID of the IAB-donor-CU associated with the target cell, an ID of an IAB-donor-DU via which the parent node that provides the target cell that backhauls traffic between the IAB-node and the IAB-donor-CU.

Aspect 18 is the method of aspect 17, where the first condition is determined based on at least one of an ID of an IAB-donor-CU associated with the target cell, or an ID of an IAB-donor-DU via which the parent node holds the first target cell and backhauls traffic between the IAB-node and the IAB-donor-CU.

Aspect 19 is the method of any of aspects 1 to 18, further including receiving an indication to forward the first message, where the first condition is based on receiving an indication to forward the first message, and where the IAB-node forwards the first message received from the first IAB-donor-CU to the child based on the received indication.

Aspect 20 is the method of aspect 19, where the IAB-node receives the indication in a F1-APmessage, an RRC message, a MAC-CE, DCI, or BAP message.

Aspect 21 is the method of any of aspects 1 to 18, further including receiving a reconfiguration message including TNL information to migrate a signaling connection onto the path holding an IAB-donor-DU, and where the first condition is based on at least one of an ID of the IAB-donor-DU or an ID of the IAB-donor-CU associated with the IAB-donor-DU.

Aspect 22 is the method of any of aspects 1 to 18, further including receiving a BAP configuration message associated with an IAB-donor-DU, and where the first condition is based on at least one of an ID of the IAB-donor-DU or an ID of the IAB-donor-CU associated with the IAB-donor-DU.

Aspect 23 is the method of any of aspects 1 to 22, where the second condition is based on whether the first condition occurs.

Aspect 24 is an apparatus for wireless communication including at least one processor coupled to a memory and configured to implement a method as in any of aspects 1 to 23.

Aspect 25 is an apparatus for wireless communication including means for implementing a method as in any of aspects 1 to 23.

Aspect 26 is a computer-readable medium storing computer executable code, where the code when executed by a processor causes the processor to implement a method as in any of aspects 1 to 23.

Aspect 27 is a method of an IAB-donor-CU, the method including, transmitting, to an IAB-node, a plurality of messages for a child, the plurality of messages including a first message being associated with a first condition, and a second message being associated with a second condition via a source path established between the IAB-node and a network, the source path including the IAB-donor-CU and a first IAB-donor-DU, and transmitting an indication instructing the IAB to forward, to the child, the first message if a first condition is met or the second message if a second condition is met.

Aspect 28 is the method of aspect 27, where the first condition is associated with switching a path between the IAB-node and the network from the source path to a first target path different from the source path, and where the first message is transmitted to the IAB-node, based on a successful switching a path between the IAB-node and the network from the source path to the first target path.

Aspect 29 is the method of aspect 28, where the first target path includes at least one of a second IAB-donor-CU different from the IAB-donor-CU or a second IAB-donor-DU different from the first IAB-donor-DU.

Aspect 30 is the method of any of aspects 27 to 29, where the plurality of messages includes a third message associated with a third condition relating to a change in a configuration of the child associated with a second target path different from the source path and a first target path associated with the first condition, the method further including instructing the IAB-node to forward, to the child, the third message and discard the first message and the second message based on the determination that that the third condition has occurred.

Aspect 31 is the method of any of aspects 27 to 30, further including indicating the IAB-node to withhold the first message and the second message until an occurrence of a respective condition.

Aspect 32 is the method of any of aspects 27 to 31, where the child is one of a child IAB-node or a UE.

Aspect 33 is the method of any of aspects 27 to 32, where the first message triggers a change in a configuration of the child associated with a first target path.

Aspect 34 is the method of any of aspects 27 to 33, where the first message is an RRC message for at least one of an RRC reconfiguration, an RRC re-establishment, an RRC release, or an RRC setup.

Aspect 35 is the method of any of aspects 27 to 34, where the second message is a message that triggers no change in a configuration of the child.

Aspect 36 is the method of any of aspects 27 to 35, where the plurality of messages is associated with a same PDCP SN.

Aspect 37 is the method of aspect 36, where the plurality of messages is transmitted in one or more containers of a single message.

Aspect 38 is the method of aspect 36, where the IAB-donor-CU individually transmits the first message and the second message to the IAB-node, and where both the first message and the second message are associated with the same PDCP SN.

Aspect 39 is the method of any of aspects 27 to 38, where the first message or the second message are sent on F1-AP messages.

Aspect 40 is the method of any of aspects 27 to 39, further including transmitting, to the IAB-node, a reconfiguration message to perform a random access procedure, where the at least one of the first condition or the second condition is based on successfully performing the random access procedure.

Aspect 41 is the method of aspect 40, further including transmitting, to the IAB-node, a reconfiguration message to switch to a target path on a target cell served by a candidate parent node, where the first condition is based on the path between the IAB-node and the network being successfully switched from the source path to a target path based on the transmitted reconfiguration message.

Aspect 42 is the method of aspect 41, where the reconfiguration message includes at least one of an ID of the IAB-donor-CU associated with a target cell, or an ID of an IAB-donor-DU via which parent node that provides the target cell that backhauls traffic between the IAB-node and the IAB-donor-CU.

Aspect 43 is the method of aspect 42, where the first condition is determined based on at least one of an ID of an IAB-donor-CU associated with the target cell, or an ID of an IAB-donor-DU via which the parent node holds the first target cell and backhauls traffic between the IAB-node and the IAB-donor-CU.

Aspect 44 is the method of any of aspects 27 to 43, further including transmitting an indication to forward the first message to the child, where the first condition is based on the indication to forward the first message.

Aspect 45 is the method of aspect 44, where the IAB-donor-CU transmits the indication in a F1-APmessage, an RRC message, a MAC-CE, DCI, or a BAP message.

Aspect 46 is the method of any of aspects 27 to 45, further including transmitting a reconfiguration message including TNL information to migrate a signaling connection onto the path holding an IAB-donor-DU, where the first condition is based on at least one of an ID of the IAB-donor-DU or an ID of the IAB-donor-CU associated with the IAB-donor-DU.

Aspect 47 is the method of any of aspects 27 to 45, further including transmitting a BAP configuration message associated with an IAB-donor-DU, where the first condition is based on at least one of an ID of the IAB-donor-DU or an ID of the IAB-donor-CU associated with the IAB-donor-DU.

Aspect 48 is the method of any of aspects 27 to 47 where the second condition is based on whether the first condition occurs.

Aspect 49 is an apparatus for wireless communication including at least one processor coupled to a memory and configured to implement a method as in any of aspects 27 to 48.

Aspect 50 is an apparatus for wireless communication including means for implementing a method as in any of aspects 27 to 48.

Aspect 51 is a computer-readable medium storing computer executable code, where the code when executed by a processor causes the processor to implement a method as in any of aspects 27 to 48.

What is claimed is:

1. An apparatus of wireless communication of an integrated access and backhaul (IAB) node, comprising:
memory; and
at least one processor coupled to the memory and configured to:
receive, from a first IAB-donor central unit (CU) (IAB-donor-CU), a plurality of messages including a first message and a second message for a child through a source path established between the IAB-node and a network, the source path including the first IAB-donor-CU and a first IAB-donor distributed unit (DU) (IAB-donor-DU);
receive an indication to forward the first message to the child if a first condition is met and to forward the second message to the child if a second condition is met, wherein the first condition is associated with switching a path between the IAB-node and the network from the source path to a first target path different from the source path;
determine that one condition among the first condition and the second condition has occurred;
forward one of the first message or the second message to the child based on an occurrence of the one condition; and
discard the other of the first message or the second message.

2. The apparatus of claim 1,
wherein the first message received from the first IAB-donor-CU is forwarded to the child based on successfully switching of the path between the IAB-node and the network from the source path to the first target path.

3. The apparatus of claim 2, wherein the first target path includes at least one of a second IAB-donor-CU different from the first IAB-donor-CU or a second IAB-donor-DU different from the first IAB-donor-DU.

4. The apparatus of claim 1, wherein the plurality of messages includes a third message associated with a third condition relating to a change in a configuration of the child associated with a second target path different from the source path and the first target path associated with the first condition, and wherein the at least one processor is further configured to:
forward, to the child, the third message received from the first IAB-donor-CU, based on a determination that the third condition has occurred; and
discard the first message and the second message.

5. The apparatus of claim 1, wherein the first message is a radio resource control (RRC) message for at least one of an RRC reconfiguration, an RRC re-establishment, an RRC release, or an RRC setup.

6. The apparatus of claim 1, wherein the at least one processor is further configured to:
forward, to the child, the second message received from the first IAB-donor-CU, based on maintaining the path between the IAB-node and the network as the source path.

7. The apparatus of claim 6, wherein the second message is a message that triggers no change in a configuration of the child.

8. The apparatus of claim 1, wherein the plurality of messages is associated with a same packet data convergence protocol (PDCP) sequence number (SN) (PDCP SN).

9. The apparatus of claim 8, wherein the plurality of messages is received in one or more containers of a single message.

10. The apparatus of claim 1, wherein the first message or the second message are sent on F1 application protocol (F1-AP) messages.

11. The apparatus of claim 1, wherein the first condition is based on receiving the indication to forward the first message, and
wherein the at least one processor is configured to forward the first message received from the first IAB-donor-CU to the child based on the received indication.

12. The apparatus of claim 11, wherein the indication is received in a F1 application protocol (F1-AP) message, a radio resource control (RRC) message, a medium access control (MAC) control element (CE) (MAC-CE), downlink control information (DCI), or a backhaul adaptation protocol (BAP) message.

13. An apparatus of wireless communication of an integrated access and backhaul (IAB) node, comprising:
memory; and
at least one processor coupled to the memory and configured to:
receive, from a first IAB-donor central unit (CU) (IAB-donor-CU), a plurality of messages including a first message and a second message for a child through a source path established between the IAB-node and a network, the source path including the first IAB-donor-CU and a first IAB-donor distributed unit (DU) (IAB-donor-DU);
receive an indication to forward the first message to the child if a first condition is met and to forward the second message to the child if a second condition is met, wherein the second condition is based on whether the first condition occurs;
determine that one condition among the first condition and the second condition has occurred;
forward one of the first message or the second message to the child based on an occurrence of the one condition; and
discard the other of the first message or the second message.

14. An apparatus of wireless communication of an integrated access and backhaul (IAB) donor central unit (CU) (IAB-donor-CU), comprising:
memory; and
at least one processor coupled to the memory and configured to:
transmit, to an IAB-node, a plurality of messages for a child, the plurality of messages including a first message being associated with a first condition, and a second message being associated with a second condition via a source path established between the IAB-node and a network, the source path including the IAB-donor-CU and a first IAB-donor distributed unit (DU) (IAB-donor-DU); and
transmit an indication instructing the IAB-node to forward, to the child, the first message if the first condition is met or the second message if the second condition is met, wherein the first condition is associated with switching a path between the IAB-node and the network from the source path to a first target path different from the source path.

15. The apparatus of claim 14,
wherein the at least one processor is configured to transmit the first message to the IAB-node, based on a successful switching the path between the IAB-node and the network from the source path to the first target path.

16. The apparatus of claim 15, wherein the first target path includes at least one of a second IAB-donor-CU different from the IAB-donor-CU or a second IAB-donor-DU different from the first IAB-donor-DU.

17. The apparatus of claim 14, wherein the plurality of messages includes a third message associated with a third condition relating to a change in a configuration of the child associated with a second target path different from the source path and the first target path associated with the first condition, and wherein the at least one processor is further configured to:
   instruct the IAB-node to forward, to the child, the third message and discard the first message and the second message based on determining that that the third condition has occurred.

18. The apparatus of claim 14, wherein the first message is a radio resource control (RRC) message for at least one of an RRC reconfiguration, an RRC re-establishment, an RRC release, or an RRC setup.

19. The apparatus of claim 14, wherein the second message is a message that triggers no change in a configuration of the child.

20. The apparatus of claim 14, wherein the plurality of messages is associated with a same packet data convergence protocol (PDCP) sequence number (SN) (PDCP SN).

21. The apparatus of claim 20, wherein the plurality of messages is transmitted in one or more containers of a single message.

22. The apparatus of claim 14, wherein the first message or the second message are sent on F1 application protocol (F1-AP) messages.

23. The apparatus of claim 14, wherein the first condition is based on the indication to forward the first message.

24. The apparatus of claim 23, wherein the indication is transmitted in a F1 application protocol (F1-AP) message, a radio resource control (RRC) message, a medium access control (MAC) control element (CE) (MAC-CE), downlink control information (DCI), or a backhaul adaptation protocol (BAP) message.

25. A method of wireless communication of an integrated access and backhaul (IAB) node, comprising:
   receiving, from a first IAB-donor central unit (CU) (IAB-donor-CU), a plurality of message including a first message and a second message for a child through a source path established between the IAB-node and a network, the source path including the first IAB-donor-CU and a first IAB-donor distributed unit (DU) (IAB-donor-DU);
   receiving an indication to forward the first message to the child if a first condition is met and to forward the second message to the child if a second condition is met, wherein the first condition is associated with switching a path between the IAB-node and the network from the source path to a first target path different from the source path;
   determining that one condition among the first condition and the second condition has occurred;
   forwarding one of the first message or the second message to the child based on an occurrence of the one condition; and
   discarding the other of the first message or the second message.

26. The method of claim 25, wherein the plurality of messages includes a third message associated with a third condition relating to a change in a configuration of the child associated with a second target path different from the source path and the first target path associated with the first condition, the method further comprising:
   forwarding, to the child, the third message received from the first IAB-donor-CU, based on a determination that the third condition has occurred; and
   discarding the first message and the second message.

27. The method of claim 25, further comprising forwarding, to the child, the second message received from the first IAB-donor-CU, based on maintaining the path between the IAB-node and the network as the source path.

28. The method of claim 25, wherein the first condition is based on receiving the indication to forward the first message, and
   wherein the IAB-node forwards the first message received from the first IAB-donor-CU to the child based on the received indication.

29. A method of wireless communication of an integrated access and backhaul (IAB) donor central unit (CU) (IAB-donor-CU), comprising:
   transmitting, to an IAB-node, a plurality of messages for a child, the plurality of messages including a first message being associated with a first condition, and a second message being associated with a second condition via a source path established between the IAB-node and a network, the source path including the IAB-donor-CU and a first IAB-donor distributed unit (DU) (IAB-donor-DU); and
   transmitting an indication instructing the IAB-node to forward, to the child, the first message if the first condition is met or the second message if the second condition is met, wherein the first condition is associated with switching a path between the IAB-node and the network from the source path to a first target path different from the source path.

30. The method of claim 29, wherein the plurality of messages includes a third message associated with a third condition relating to a change in a configuration of the child associated with a second target path different from the source path and the first target path associated with the first condition, the method further comprising instructing the IAB-node to forward, to the child, the third message and discard the first message and the second message based on determining that that the third condition has occurred.

31. A method of wireless communication of an integrated access and backhaul (IAB) node, comprising:
   receiving, from a first IAB-donor central unit (CU) (IAB-donor-CU), a plurality of message including a first message and a second message for a child through a source path established between the IAB-node and a network, the source path including the first IAB-donor-CU and a first IAB-donor distributed unit (DU) (IAB-donor-DU);
   receiving an indication to forward the first message to the child if a first condition is met and to forward the second message to the child if a second condition is met, wherein the second condition is based on whether the first condition occurs;
   determining that one condition among the first condition and the second condition has occurred;
   forwarding one of the first message or the second message to the child based on an occurrence of the one condition; and discarding the other of the first message or the second message.

\* \* \* \* \*